(12) United States Patent
Liu et al.

(10) Patent No.: US 10,117,261 B2
(45) Date of Patent: Oct. 30, 2018

(54) DEVICE, NETWORK, AND METHOD FOR COMMUNICATIONS WITH CARRIER SENSING AND COEXISTENCE

(71) Applicant: Futurewei Technologies, Inc., Plano, TX (US)

(72) Inventors: Jialing Liu, Palatine, IL (US); Fei Teng, Evanston, IL (US); Zhiyi Zhou, Evanston, IL (US); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 135 days.

(21) Appl. No.: 14/881,981

(22) Filed: Oct. 13, 2015

(65) Prior Publication Data

US 2016/0105897 A1  Apr. 14, 2016

Related U.S. Application Data

(60) Provisional application No. 62/063,290, filed on Oct. 13, 2014.

(51) Int. Cl.
*H04W 72/12* (2009.01)
*H04W 84/04* (2009.01)
*H04W 74/08* (2009.01)

(52) U.S. Cl.
CPC .... *H04W 72/1226* (2013.01); *H04W 74/0808* (2013.01); *H04W 84/045* (2013.01)

(58) Field of Classification Search
CPC ......... H04W 72/1226; H04W 74/0808; H04W 84/045; H04W 74/08–74/0891;
(Continued)

(56) References Cited

U.S. PATENT DOCUMENTS

2004/0013174 A1*  1/2004  Nuutinen ............. H04B 1/7115
                                                                          375/148
2009/0247206 A1* 10/2009  Yacono ................. H04W 24/02
                                                                          455/515
(Continued)

FOREIGN PATENT DOCUMENTS

CN        101583141 A        11/2009
CN        101765124 A         6/2010
(Continued)

OTHER PUBLICATIONS

Teng, F., "Performance Evaluation for Carrier Sensing at High Frequency," Department of Electrical Engineering and Computer Science, Northwestern University, Oct. 2014, 5 pages.
(Continued)

*Primary Examiner* — Edan Orgad
*Assistant Examiner* — Ivan O Latorre
(74) *Attorney, Agent, or Firm* — Slater Matsil, LLP

(57) ABSTRACT

A network and method for wireless communications are provided. A first network element in the network may transmit a first reservation signal to reserve a channel. The first reservation signal may at least partially overlap a second reservation signal transmitted by a second network element for channel reservation. The first network element and the second network element share the same channel. The first network element may also perform interference cancellation to cancel the second reservation signal transmitted by the second network element for carrier sensing.

20 Claims, 12 Drawing Sheets

(58) Field of Classification Search
CPC ..... H04W 88/06; H04W 88/10; H04W 16/14; H04J 11/0023–11/0066; H04B 1/0475–1/1036; H04B 1/7097–1/715; H04B 2001/1045
See application file for complete search history.

(56) References Cited

U.S. PATENT DOCUMENTS

| | | | | |
|---|---|---|---|---|
| 2013/0017794 | A1* | 1/2013 | Kloper | H04W 74/0808 455/63.1 |
| 2013/0189927 | A1* | 7/2013 | Wu | H04J 11/005 455/63.1 |
| 2013/0208587 | A1 | 8/2013 | Bala et al. | |
| 2014/0079015 | A1* | 3/2014 | Kim | H04W 28/26 370/329 |
| 2014/0341018 | A1* | 11/2014 | Bhushan | H04W 28/0289 370/230 |
| 2014/0362780 | A1* | 12/2014 | Malladi | H04W 16/14 370/329 |
| 2015/0043687 | A1* | 2/2015 | Luo | H04B 1/006 375/349 |
| 2015/0092758 | A1* | 4/2015 | Chen | H04W 16/14 370/336 |
| 2015/0110066 | A1* | 4/2015 | Gaal | H04W 72/0453 370/330 |
| 2015/0156650 | A1 | 6/2015 | Li et al. | |
| 2015/0223075 | A1* | 8/2015 | Bashar | H04W 16/14 370/329 |
| 2015/0263773 | A1* | 9/2015 | Suzuki | H04L 67/12 375/219 |
| 2015/0358904 | A1* | 12/2015 | Kwon | H04W 52/0206 370/252 |
| 2015/0365971 | A1* | 12/2015 | Chen | H04W 74/0816 370/252 |
| 2016/0013878 | A1* | 1/2016 | Zhao | H04L 25/03968 370/329 |
| 2016/0037560 | A1 | 2/2016 | Liu et al. | |
| 2017/0215205 | A1* | 7/2017 | Takeda | H04W 74/0816 |

FOREIGN PATENT DOCUMENTS

| | | |
|---|---|---|
| WO | 2013112983 A2 | 8/2013 |
| WO | 2013143053 A1 | 10/2013 |

OTHER PUBLICATIONS

3GPP, "3rd Generation Partnership Project; Technical Specification Group Radio Access Network; Study on Licensed-Assisted Access to Unlicensed Spectrum; (Release 13)," 3GPP TR 36.889 v13.0.0, 87 pages.

Zhou, Z., et al. "Performance Evaluation for Coexistence of LTE and Wifi," Department of Electrical Engineering and Computer Science, Northwestern University, 6 pages.

* cited by examiner

DEVICE, NETWORK, AND METHOD FOR COMMUNICATIONS WITH CARRIER SENSING AND COEXISTENCE

This patent application claims priority to U.S. Provisional Application No. 62/063,290, filed on Oct. 13, 2014 and entitled "Device, Network, and Method for Communications with Carrier Sensing and Coexistence", which is hereby incorporated by reference herein as if reproduced in its entirety.

TECHNICAL FIELD

The present disclosure relates to wireless communications, and, in particular embodiments, to a device, network, and method for communications with carrier sensing and coexistence.

BACKGROUND

The amount of wireless data being transferred is expected to exceed that of wired data, pushing the limits of macro cellular deployment. Small cell deployment with higher density and/or with diversified spectrum resources may be used to help handle this increase in data capacity, while meeting customer quality of service expectations and operators' requirements for cost-effective service delivery.

Small cells generally are low-power wireless access points that operate in a licensed spectrum. Small cells provide improved cellular coverage, capacity and applications for homes and businesses, as well as metropolitan and rural public spaces. Different types of small cells include, generally from smallest size to largest size, femtocells, picocells, and microcells. Small cells may be densely deployed and may also utilize additional spectrum resources, such as unlicensed spectrum resources, and high-frequency spectrum resources, etc.

SUMMARY OF THE INVENTION

Technical advantages are generally achieved, by embodiments of this disclosure which describe device, network, and method for communications with carrier sensing and coexistence.

In accordance with an embodiment, a method for wireless communications is provided. In this example, the method includes sensing, by a second network element, a first reservation signal transmitted by a first network element in a sensing region of a frame communicated over a carrier. The first network element and the second network element share the carrier. The method further includes performing, by the second network element, interference cancellation on sensed signals of the second network element to remove the first reservation signal from the sensed signals, thereby generating a residual sensed signal, and transmitting, by the second network element, a second reservation signal in the sensing region of the frame when a power level of the residual sensed signal is less than a threshold. An apparatus for performing this method is also provided.

In accordance with another embodiment, a method for wireless communications is provided. In this example, the method includes sensing, by a first network element, a first set of frequency subcarriers of a carrier in a sensing region of a frame. The method also includes determining, by the first network element, that the carrier is unoccupied when a power level of sensed signals in the first set of frequency subcarriers is greater than a threshold. The method further includes transmitting, by the first network element, a first reservation signal over the first set of frequency subcarriers of the carrier in the sensing region. The first reservation signal at least partially overlaps a second reservation signal in the time domain, and the second reservation signal is transmitted by a second network element over a second set of frequency subcarriers of the carrier orthogonal to the first set of frequency subcarriers. The first network element is within a listening distance of the second network element. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless other-

DETAILED DESCRIPTION OF ILLUSTRATIVE EMBODIMENTS

Figure 1A:
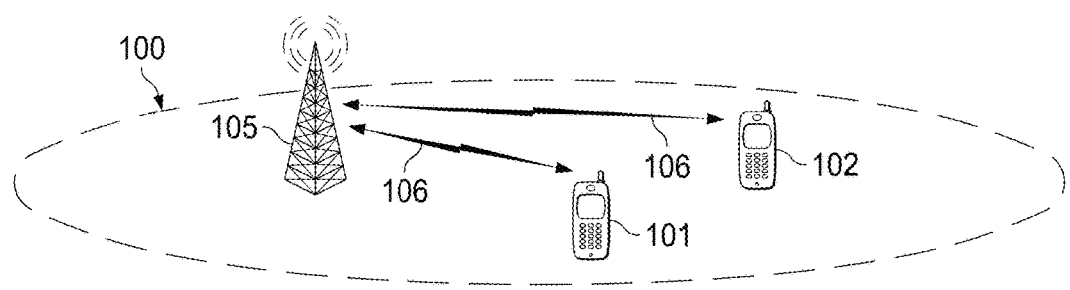
FIG. 1A illustrates a schematic diagram of an embodiment wireless communications system.

The making and using of embodiments of this disclosure are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure. Additional details of this disclosure are provided in the Appendices filed herewith.

Demand for wireless communication network capacity is growing fast. Network capacity may be increased by utilizing more usable spectrum resources, such as the unlicensed spectrum resources, shared spectrums, and high-frequency spectrums with millimeter wavelength range. Third Generation Partnership Project (3GPP) has proposed Long Term Evolution (LTE) networks that operate on unlicensed spectrum, which are referred to as unlicensed LTE (U-LTE) networks. Subframes for communicating over an unlicensed carrier in U-LTE networks may include sensing regions and data regions. Network elements may perform carrier sensing in the sensing region to determine whether the channel is occupied. If the channel is not occupied, then a network element may transmit a reservation signal in the sensing region to reserve the channel for a transmission of the network element. In some situations, multiple network elements (e.g., neighboring base stations) may wish to perform a transmission over the same time and frequency resources. However, conventional U-LTE networks only permit one network element to reserve a channel. Hence, in conventional U-LTE networks, a network element that senses a reservation signal of another network element is prohibited from transmitting in, or attempting to reserve, the carrier.

Aspects of the present disclosure provide a method that allows multiple network elements to transmit reservation signals overlapping in the time domain. In one embodiment, different network elements transmit their reservation signals on different sub-carriers in the sensing region. In another embodiment, one network element transmits its reservation signal in a sensing region after sensing another reservation signal in the sensing region. In another example, the network element performs signal/interference cancellation to remove the sensed reservation signal from the sensing region, and then determines that the channel is idle when a remaining signal power of the sensing region is less than a threshold. If the remaining signal power of the sensing region exceeds the threshold, then it may be likely that the channel is being accessed by another user or that an additional reference signal is present in the sensing region.

Typically, in a modern wireless communications system, such as a 3GPP LTE compliant communications system, a plurality of cells or evolved NodeBs (eNBs), which may also be referred to as NodeBs, base stations (BSs), base terminal stations, communications controllers, network controllers, controllers, access points (APs), and may be referred more generally as network elements, may be arranged into a cluster of cells, with each cell having multiple transmit antennas. Additionally, each cell or eNB may be serving a number of users that communicate via network elements, which are also commonly referred to as User Equipment (UE), wireless devices, mobile stations, subscribers and terminals, based on a priority metric, such as fairness, proportional fairness, round robin, and the like, over a period of time. It is noted that the terms "cell", "transmission point", and "eNB" may be used interchangeably throughout this disclosure. Distinctions between cells, transmission points, and eNBs will be made where needed.

FIG. 1A illustrates an embodiment wireless communications system 100 with a communications controller 105 communicating using a wireless link 106 with a first wireless device 101 and a second wireless device 102. The wireless link 106 may include a single carrier frequency, such as a carrier frequency used typically for a time division duplex (TDD) configuration, or a pair of carrier frequencies as used in a frequency division duplex (FDD) configuration. Not shown in the system 100 are some of the network elements used to support the communications controller 105, such as a backhaul, or management entities, etc. The transmission/reception from the communications controller to a UE is called downlink (DL) transmission/reception, and the transmission/reception from a UE to a communications controller is called uplink (UL) transmission/reception.

Figure 1B:
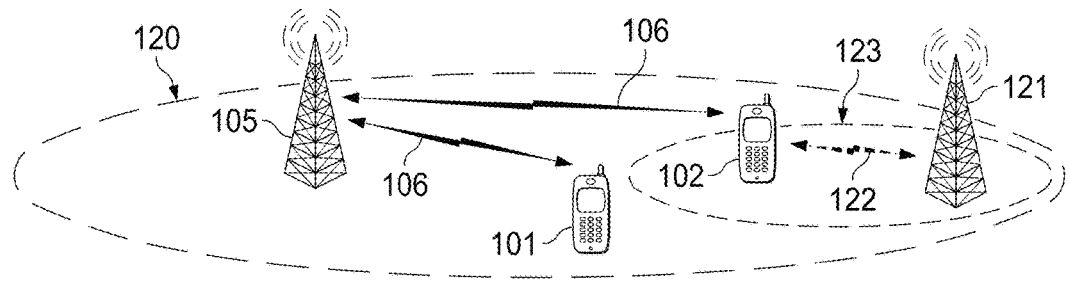
FIG. 1B illustrates a schematic diagram of another embodiment wireless communications system.

FIG. 1B illustrates an embodiment wireless communications system 120 in a heterogeneous network (HetNet). The system 120 includes a communications controller 105 communicating with a wireless device 101 using a wireless link 106 (solid line) and a wireless device 102 using a wireless link 106. The system 120 further includes a second communications controller 121, such as a pico cell, that has a coverage area 123 and is capable of communicating to a wireless device 102 using a wireless link 122 (dashed line). The coverage area 123 of the second communications controller 121 may be partially or fully within the coverage area of the communications controller 105. The wireless link 122 and the wireless link 106 may use the same carrier frequency. Alternatively, the wireless link 122 and the wireless link 106 may use different carrier frequencies. There may be a backhaul (not shown) connecting the communications controller 105 and the communications controller 121. The communications controller 105 may be a macro cell, and the second communications controller 121 may be a pico cell. Alternatively, the communications controller 105 may be generally a higher power node or antenna with a larger coverage and the second communications controller 121 may be a lower power node or antenna with a smaller coverage. Lower power nodes, which may be lower power points, picos, femtos, micros, relay nodes, remote radio heads (RRHs), remote radio units, or distributed antennas, are generally low-power wireless access points that operate in a licensed spectrum. A low-power node generally means a node whose transmission power is lower than a macro node and BS classes, for example a Pico eNB or a Femto eNB is a low-power node. Small cells may use lower power nodes. Lower power nodes provide improved cellular coverage, capacity and applications for homes and businesses, as well as metropolitan and rural public spaces. The communications controller 105 may be referred to as a macro point, and the communications controller 121 may be referred to as a pico point.

In accordance with some embodiments, the system 120 may include multiple macro points 105 and multiple pico points 121 operating with multiple component carriers, and the backhaul between any two points may be fast backhaul or slow backhaul depending on the deployment. When two points have fast backhaul, the fast backhaul may be fully utilized, e.g., to simplify communication methods and system structures or to improve coordination. In a realistic network, multiple points may be configured for a UE for transmission or reception. Some pairs of points may have fast backhaul, but some other pairs of points may have slow backhaul or any backhaul.

An eNodeB may control one or more cells. Multiple remote radio units may be connected to the same base band unit of the eNodeB by fiber cables, and the latency between the base band unit and the remote radio units is quite small. Therefore the same base band unit may process the coordinated transmission/reception of multiple cells. For example, an eNodeB may coordinate the transmissions of multiple cells to a UE, which is called coordinated multiple point (CoMP) transmission. The eNodeB may also coordinate the reception of multiple cells from a UE, which is called CoMP reception. In this case, the backhaul link between these cells and the eNodeB may be fast backhaul and scheduling of data transmitted in different cells for the UE may be coordinated by the same eNodeB.

As an extension of the HetNet deployment, densely deployed small cells using lower power nodes are considered promising in coping with mobile traffic explosion, especially for hotspot deployments in indoor and outdoor scenarios. Small cell enhancements for Evolved Universal Terrestrial Radio Access (E-UTRA) and Evolved Universal Mobile Telecommunications System (UMTS) Terrestrial Radio Access Network (E-UTRAN), which is an ongoing study in 3GPP, will focus on additional functionalities for enhanced performance in hotspot areas for indoor and outdoor use, such as using densely deployed lower power nodes.

Figure 1C:
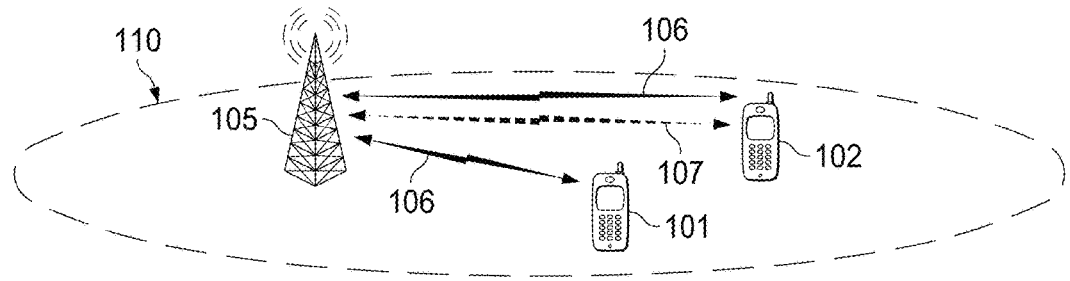
FIG. 1C illustrates a schematic diagram of yet another embodiment wireless communications system.

FIG. 1C illustrates an embodiment wireless communications system 110 in a macro cell configured with carrier aggregation (CA), where a communications controller 105 communicates to a wireless device 101 using a wireless link 106 (solid line), and to a wireless device 102 using a wireless link 107 (dashed line) and the wireless link 106. In accordance with some embodiments, for the wireless device 102, the wireless link 106 may be called a primary component carrier (PCC) while the wireless link 107 may be called a secondary component carrier (SCC). In accordance with some embodiments of carrier aggregation deployment, the PCC may be used to provide feedback from a wireless device to a communications controller while the SCC may carry data traffic. In the 3GPP Rel-10 specification, a component carrier is called a cell. When multiple cells are controlled by a same eNodeB, a single scheduler in the same eNodeB may be used for cross scheduling of multiple cells. In the system 110 with carrier aggregation, one eNB may operate and control several component carriers forming a primary cell (Pcell) and a secondary cell (Scell). In accordance with the specification of 3GPP Rel-11, an eNodeB may control both a macro cell and a pico cell. In this case, the backhaul between the macro cell and the pico cell is fast backhaul. The eNodeB may control the transmission/reception of both macro cell and pico cell dynamically.

Figure 1D:
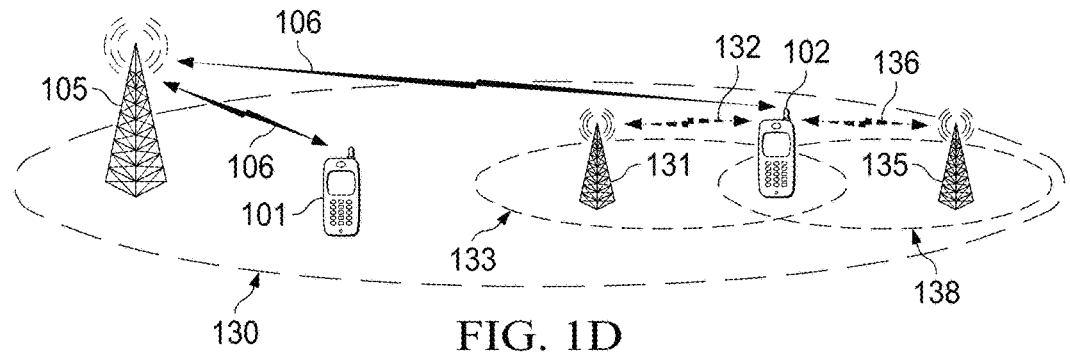
FIG. 1D illustrates a schematic diagram of yet another embodiment wireless communications system.

FIG. 1D illustrates an embodiment wireless communications system 130 in a heterogeneous network with a macro cell and multiple small cells. As shown, the system 130 includes a communications controller 105 communicating to a wireless device 101 using a wireless link 106 (solid line) and to a wireless device 102 using a wireless link 106. A second communications controller 131, such as a small cell, has a coverage area 133 and is capable of communicating with the wireless device 102 using a wireless link 132 (dashed line). A communications controller 135 for another small cell has a coverage area 138 and uses a wireless link 136 (dashed line). The communications controller 135 is capable of communicating with the wireless device 102 using the wireless link 136. Coverage areas 133 and 138 may overlap. The carrier frequencies for wireless links 106, 132, and 136 may be the same or may be different.

Figure 1E:
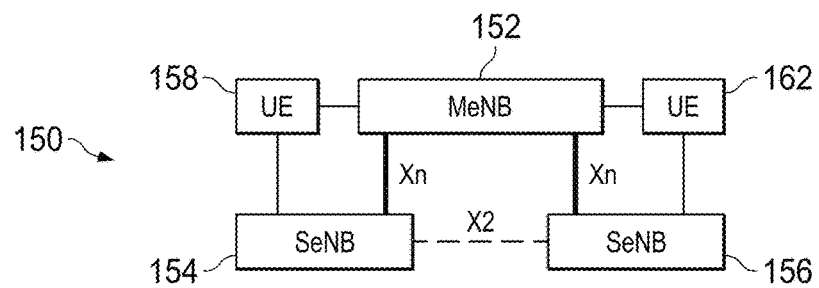
FIG. 1E illustrates a block diagram of an embodiment communications system configured for dual connectivity.

FIG. 1E illustrates a block diagram of an embodiment wireless communications system 150 configured for dual connectivity. The system 150 may include a master eNB (MeNB) 152 connected to one or more secondary eNBs (SeNBs), such as SeNBs 154 and 156, through an interface such as an Xn interface. The Xn interface may be an X2 interface in one embodiment. The backhaul may support such an interface. The SeNBs 154 and 156 may be connected through an X2 interface. A user, such as UE 158, is connected wirelessly to MeNB 152 and SeNB 154, while a second user, such as UE 162, may be connected wirelessly to MeNB 152 and SeNB 156.

In orthogonal frequency-division multiplexing (OFDM) systems, the frequency bandwidth is divided into multiple subcarriers in the frequency domain. In the time domain, one subframe is divided into multiple OFDM symbols. Each OFDM symbol may have a cyclic prefix to avoid the inter-symbol interference due to multiple path delays. One resource element (RE) is defined by the time-frequency resource within one subcarrier and one OFDM symbol. Orthogonal signals, including a reference signal and other signals, such as a data channel, e.g. physical downlink shared channel (PDSCH), and a control channel, e.g. physical downlink control channel (PDCCH), are multiplexed in different resource elements in the time-frequency domain, and are modulated and mapped into the resource elements. For each OFDM symbol, the signals in the frequency domain are transformed into signals in the time domain using, e.g., Fourier transforms, and are transmitted with the added cyclic prefix to avoid inter-symbol interference.

Figure 2:
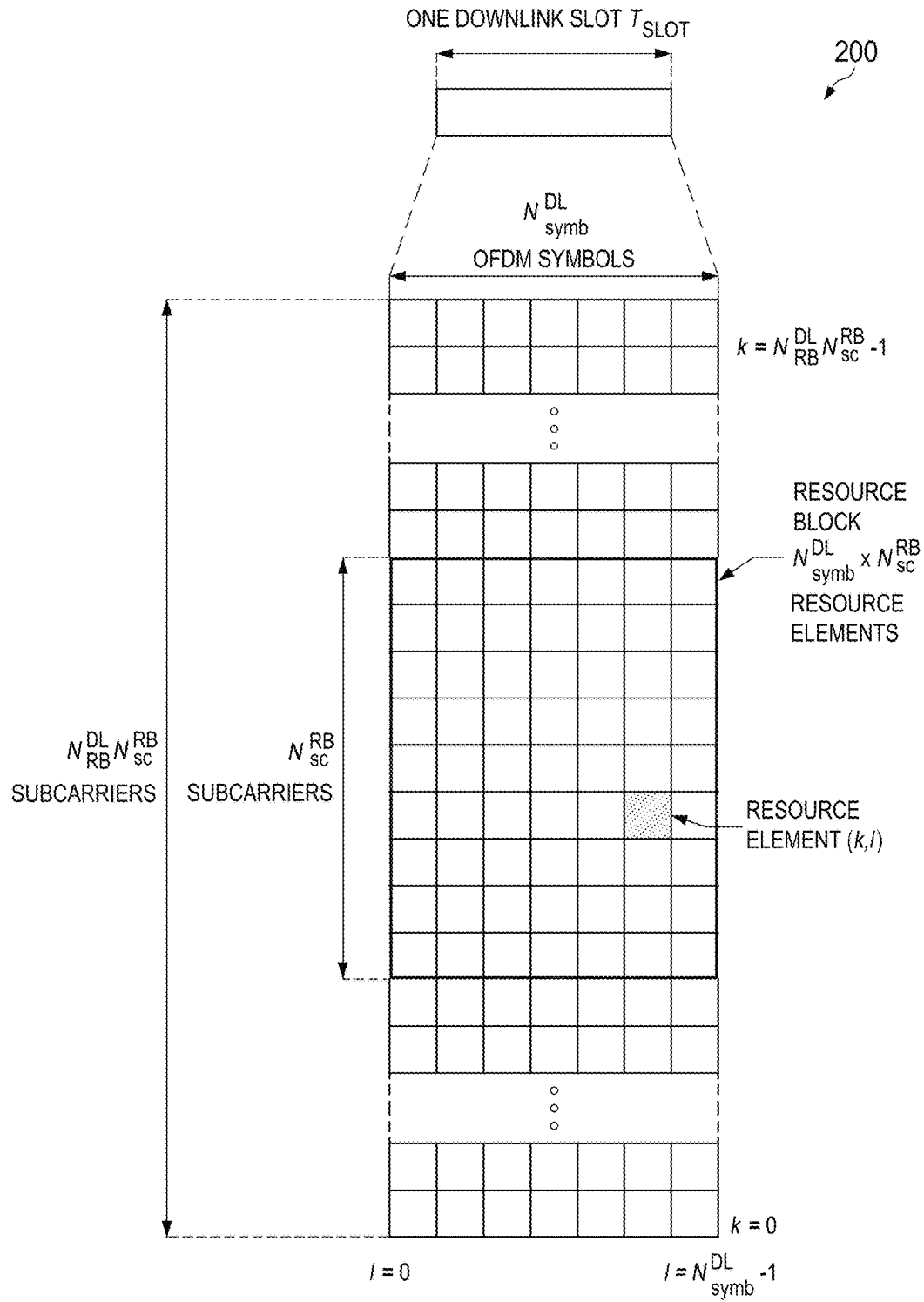
FIG. 2 illustrates a diagram of embodiment orthogonal frequency division multiplexing (OFDM) symbols with normal cyclic prefix.

FIG. 2 illustrates an embodiment downlink OFDM slot 200 including OFDMA symbols with normal cyclic prefix (CP). As shown, the OFDM slot 200 includes $N_{symb}^{DL}$ OFDM symbols, and $N_{RB}^{DL} \times N_{sc}^{RB}$ subcarriers, where $N_{RB}^{DL}$ is the number of resource blocks and $N_{sc}^{RB}$ is the number of subcarriers in each resource block. Each resource block (RB) contains a number of REs. FIG. 2 illustrates one slot of an OFDMA subframe. In one embodiment, the OFDM subframe includes 14 OFDM symbols labeled from 0 to 13 (not shown). The symbols 0 to 6 (not shown) correspond to even numbered slots, and the symbols 7 to 13 (not shown) correspond to odd numbered slots. FIG. 2 shows 7 symbols. The slot 200 includes a number of resource blocks, and each resource block includes 12 subcarriers and 7 symbols which is the number of symbols in a slot, and thus there are 12×14=168 resource elements in a RB pair.

Figure 3:
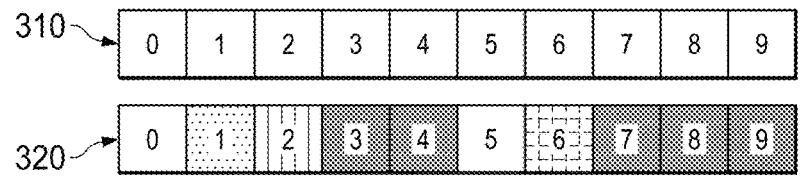
FIG. 3 illustrates a diagram of embodiment frame configurations used in 3GPP LTE.

FIG. 3 illustrates embodiment frame configurations used in 3GPP LTE. FIG. 3 illustrates a radio frame 310 which is typically used for an FDD configuration. Radio frame 310 includes 10 subframes, labeled 0 through 9, communicating in a same direction, e.g., the 10 subframes are all for downlink communications. Each subframe may be 1 millisecond in duration and thus the radio frame 310 is 10 milliseconds in duration. FIG. 3 further illustrates a radio frame 320 which shows a TDD configuration. Some subframes of the radio frame 320 may be allocated for downlink transmissions, such as subframes 0 and 5 indicated by unshaded boxes, some subframes of the radio frame 320 may be allocated for uplink transmissions, such as subframe 2 indicated by a vertical-line shaded box, and some subframes of the radio frame 320 may be special frames, such as subframe 1 indicated by a dotted box. Subframe 1 may include both uplink and downlink transmissions. An entire subframe dedicated for downlink (or uplink) transmission may be called a downlink (or uplink) subframe. Subframe 6 may be either a downlink or a special subframe depending on TDD configuration. Each of the solid shaded boxes, i.e., subframes 3, 4, 7, 8, and 9, may be either a downlink subframe or an uplink subframe depending on TDD configuration. The shading of the subframe boxes in the radio frame 320 is used according to the technical specification group (TSG) 36.211 Rel. 11 standards and is for illustrative purpose only.

Figure 4:
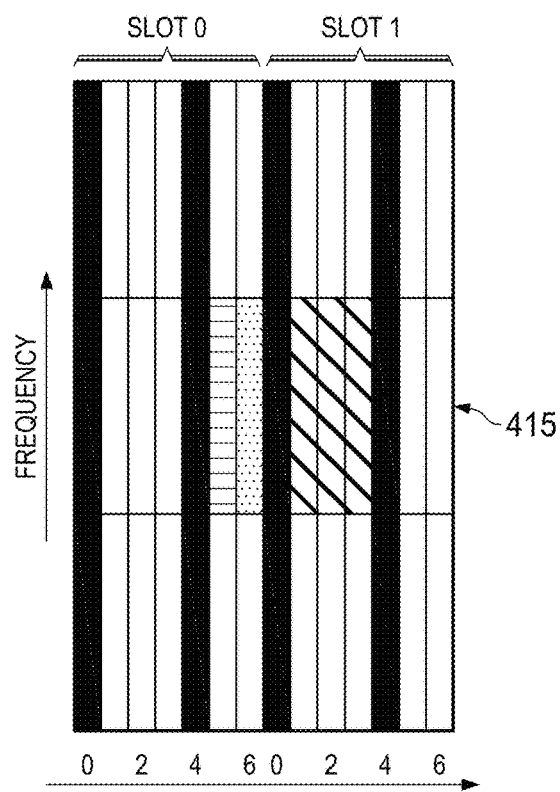
FIG. 4 illustrates a diagram of an embodiment subframe.
Figure 5:
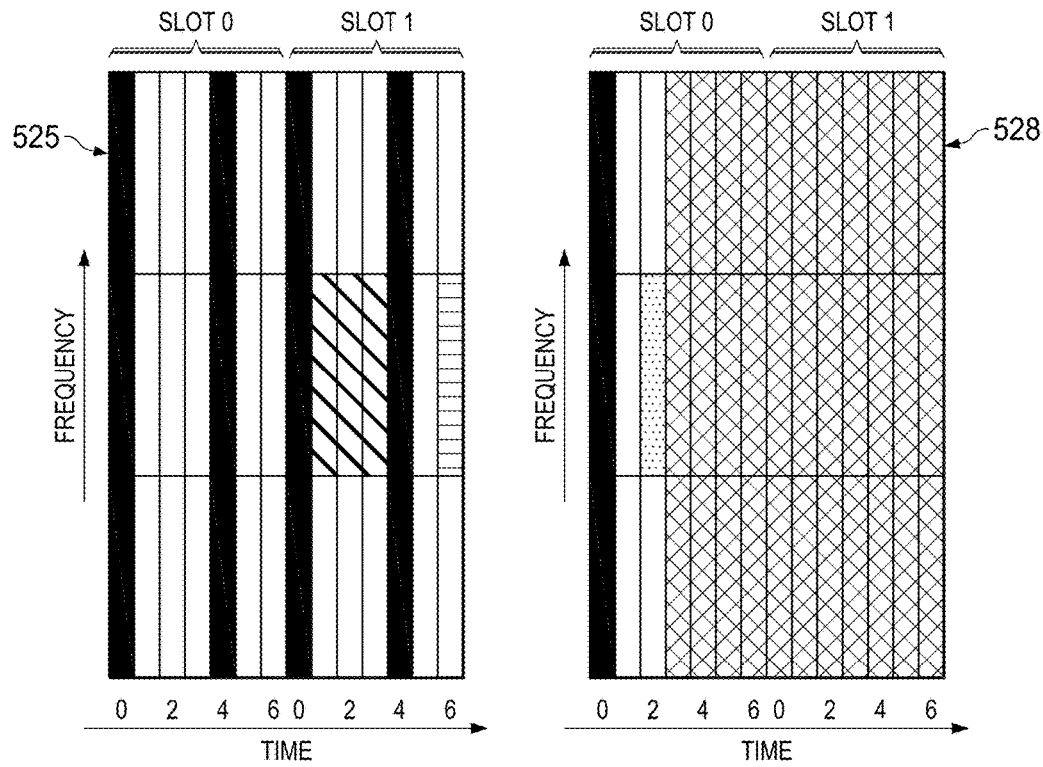
FIG. 5 illustrates a diagram of embodiment subframes.

FIG. 4 and FIG. 5 illustrate embodiment downlink subframes that are partitioned in terms of symbols and frequencies. As shown in FIGS. 4 and 5, a subframe is divided into three (3) sections in the frequency domain, with an assumption that the number of RBs of the subframe is greater than six (6). An analogous diagram can be shown for a 6 RBs downlink bandwidth (e.g., bandwidth of a downlink carrier).

FIG. 4 illustrates an embodiment downlink subframe 415 which shows the symbol allocation for a subframe in an FDD configuration, e.g., for subframes 0 and 5 in the frame 310 of FIG. 3. The subframe 415 is divided into three sections in the frequency domain, and includes two slots of symbols, namely slot 0 and slot 1. Each of the slot 0 and slot 1 includes seven (7) symbols labeled 0 through 6. The solid shading portions of FIG. 4 represent symbols allocated for common reference signals (CRSs). In accordance with one embodiment, the CRS may be transmitted on antenna port 0 or on antenna ports 0 and 1. The horizontal shading portion shows the symbol allocated to a secondary synchronization signal (SSS), and the dotted shading portion shows the symbol allocated to a primary synchronization signal (PSS). Both the PSS and SSS occupy the center six resource blocks of a downlink carrier. The diagonal-line portions in symbols 0, 1, 2, 3 of slot 1 represent the location that the physical broadcast channel (PBCH) occupies for subframe 0 in the radio frame 310 of FIG. 3. The PBCH is not transmitted in subframe 5 according to the TSG 36.211 Rel. 11 standard. The PSS, SSS, and CRS may be viewed as overhead.

FIG. 5 illustrates two subframes 525 and 528. The subframe 525 shows an example of symbol allocation for subframes 0 and 5 of the radio frame 320 in FIG. 3, and the subframe 528 shows an example of symbol allocation for subframes 1 and 6 of the radio frame 320. In both subframe 525 and subframe 528, the solid shading portions show the symbols allocated for CRSs. In one embodiment, the CRSs may be transmitted on an antenna port 0 or on antenna ports 0 and 1. The horizontal shading portion in subframe 525 shows the location of a SSS. The dotted shading portion in subframe 528 shows the location of a PSS. Both the PSS and SSS occupy the center six RBs of a downlink carrier. The cross shading portions in subframe 528 indicate that the remaining symbols of the subframe may be downlink symbols when subframe 6 is a downlink subframe, or may be a combination of downlink symbols, guard time, and uplink symbols when subframe 6 is a special subframe. Similar to FIG. 4, the diagonal-line portions in symbols 0, 1, 2, 3 of slot 1 in the subframe 525 represent the location that the PBCH occupies, e.g., for subframe 0 in the frame 310 of FIG. 3. As described above, the PBCH is not transmitted in subframe 5 according to the TSG 36.211 Rel. 11 standard, and the PSS, SSS, and CRS may be viewed as overhead. The information contents of the PBCH, i.e., the parameters carried in a master information block, may change every 40 milliseconds (ms).

In downlink transmission of an LTE Advanced (LTE-A) system, there is a reference signal for a UE to perform channel estimation for demodulation of physical downlink control channel (PDCCH) and other common channels, as well as for measurement and some feedbacks. The reference signal is a CRS inherited from the Rel-8/9 specification of E-UTRA. Dedicated/de-modulation reference signal (DMRS) may be transmitted together with the physical downlink shared channel (PDSCH) according to the specification of E-UTRA Rel-10. DMRS is used for channel estimation during PDSCH demodulation. DMRS may also be transmitted together with an enhanced PDCCH (EPDCCH) for channel estimation of the EPDCCH by a UE. Throughout the disclosure, the notation (E)PDCCH may indicate an EPDCCH or a PDCCH, or both.

In the specification of E-UTRA Rel-10, a channel status indicator reference signal (CSI-RS) is introduced in addition to the CRS and DMRS. CSI-RS is used for UEs compliant with the E-UTRA Rel-10 standard to measure channel status, especially when multiple antennas are involved for transmission. The precoding matrix indicator (PMI), channel quality indicator (CQI), rank indicator of (RI) of a precoding matrix, and other feedback may be generated according to the measurement of CSI-RS for Rel-10 and beyond UEs. There may be multiple CSI-RS resources configured for a UE. A specific time-frequency resource and a scrambling code are assigned for each CSI-RS resource by an eNB.

A small cell operating with frequent on/off adaptation or power adaptation (e.g., in a time scale shorter than hours) may not be suitable to support idle UEs, because rapid adaptation may cause idle UEs to enter cell reselection frequently and consume power. Likewise, a small cell may not be suitable for coverage support that a macro cell may provide. In one embodiment, such a small cell may be mainly used to support active UEs' high traffic demand in addition to the basic functionalities provided by a coverage layer. Cells on the coverage layer may not perform on/off adaptation, or may not do so very frequently. Idle UEs may be connected to coverage layer cells only, and thus small cells do not have to be standalone cells at least from the perspective of legacy UEs. In certain isolated local areas where high capacity is desirable, standalone small cells operating with on/off adaptation may be deployed.

In accordance with some embodiments, a wireless network may include a coverage layer whose cells do not perform network adaptation or do not perform network adaptation at least very frequently or significantly, and a capacity layer whose cells, which may include mainly small cells, may perform network adaptation. Support for coverage, mobility and idle UEs may be mainly provided by the coverage layer. In one embodiment, UEs may be connected to cells in a coverage layer first, and connected to small cells in a capacity layer when needed. The small cells may be co-channel or non-co-channel with those cells in the coverage layer. FIG. 1B shows such an example deployment.

In accordance with some other embodiments, a wireless network may adopt a virtual cell configuration (e.g., CoMP Scenario 4), and small cells in the network may be configured and turned on opportunistically for UEs with high traffic demand. Thus, in such a network, coverage and idle UE support may be ensured and may not be affected by small cell adaptation.

The mechanism of dynamically switching on/off a small cell is beneficial when further evolution of small cell networks is envisioned. Specifically, to accommodate the ever increasing needs in data capacity, while meeting customer quality of service expectations and operators' requirements for cost-effective service delivery, densification of a small cell network is proposed. Generally, doubling the density of a small cell network may yield doubling of the capacity of the network. However, densification leads to higher interference, especially the interference caused by common channels (e.g. the CRS), which are in persistent transmission. Turning off a small cell opportunistically may significantly help reduce interference and improve efficiency of a dense network.

In parallel with increasing network resources by densifying a small cell network, network resources may be increased by utilizing more usable spectrum resources, which include not only licensed spectrum resources of the same type resource as a macro cell, but also licensed spectrum resources of a different type from a macro cell (e.g., the macro is a FDD cell, while a small cell may use both FDD and TDD carriers), as well as unlicensed spectrum resources, shared spectrums, and high-frequency spectrums with millimeter wavelength range, e.g., the mmWaves, which may also be called mm waves, mm-waves, or mmWs. The unlicensed spectrums may be used generally by any user subject to regulation requirements. Traditionally the unlicensed spectrums are not used by cellular networks as they are generally difficult to ensure quality of service (QoS) requirements. Networks operating in the unlicensed spectrums mainly include wireless local area networks (WLAN), e.g. Wi-Fi networks. Due to the fact that the licensed spectrums are generally scarce and expensive, utilizing the unlicensed spectrums by a cellular operator may be considered. TDD is generally used on high-frequency bands, unlicensed bands and shared-licensed bands, and hence channel reciprocity may be exploited for communications.

There is generally no pre-coordination among multiple nodes operating on the same frequency resources in unlicensed spectrums. A contention-based protocol (CBP) may be used. According to Section 90.7 of Part 90 (paragraph 58) of the United States Federal Communication Commission (FCC), CBP is "A protocol that allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel." A state of a channel being busy may be referred to as channel unavailable, channel not clear, or channel being occupied. A state of a channel being idle may be referred to as channel available, channel clear, or channel not occupied.

Figure 6:
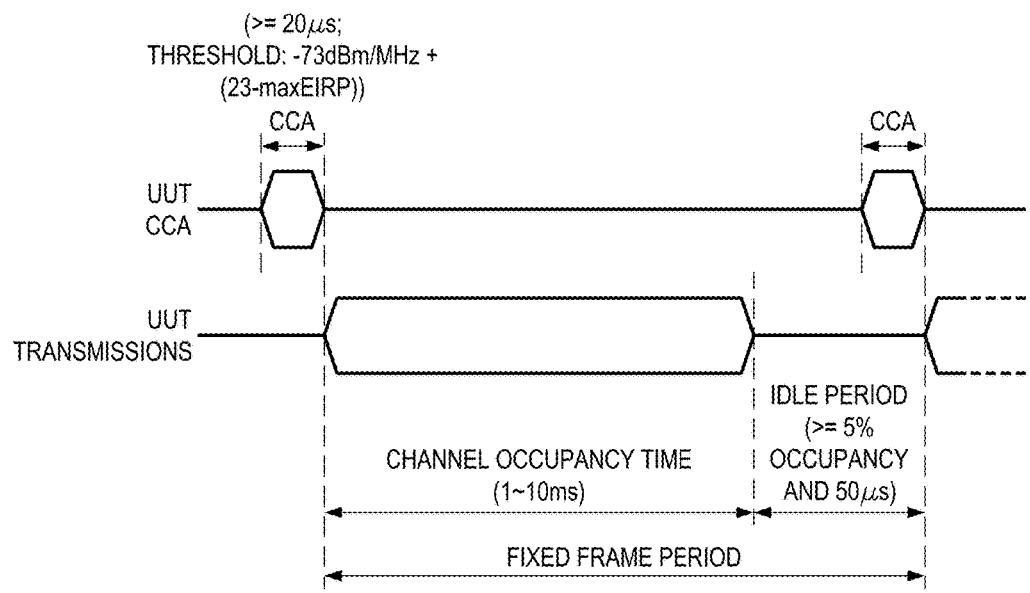
FIG. 6 illustrates a diagram of an embodiment operation of frame based equipment.

One of the most used CBP is the "listen before talk" (LBT) operating procedure specified in Institute of Electrical and Electronics Engineering (IEEE) 802.11 standard or Wi-Fi standard. The LBT is also known as the carrier sense multiple access with collision avoidance (CSMA/CA) protocol. According to LBT, carrier sensing is performed before any transmission attempt, and transmission is performed only if a carrier for transmission is sensed to be idle; otherwise a random back-off time for next sensing is applied. Carrier sensing is generally done through a clear channel assessment (CCA) procedure which determines whether the in-channel power of a carrier is below a given threshold. Clause 4.9.2 of European Telecommunications Standards Institute (ETSI) Harmonized European Standard (EN) 301 893 V1.7.1 describes two types of adaptive equipment operating in an adaptive mode, i.e., frame based equipment and load based equipment, and a timing diagram for the frame based equipment, which is illustrated in FIG. 6. According to the ETSI EN 301 893 V1.7.1 standard, a frame based equipment may perform a clear channel assessment check using "energy detect". The equipment observes one or more operating channels for duration of the CCA observation time. An operating channel is considered occupied if the energy level in the channel exceeds a threshold corresponding to a power level. If the equipment finds an operating channel to be clear, it may transmit data immediately. If the equipment finds an operating channel occupied, it does not transmit on that channel during the next fixed frame period.

Figure 7:
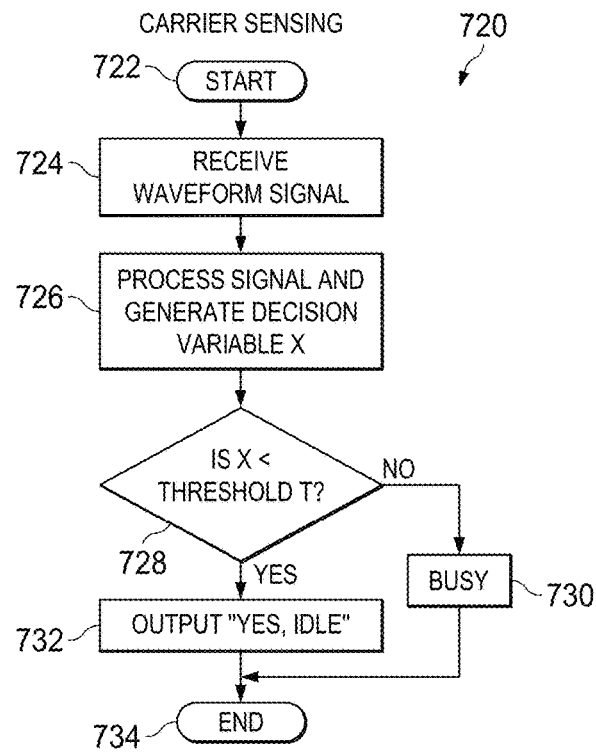
FIG. 7 illustrates a flow chart of an embodiment method of carrier sensing.

FIG. 7 illustrates a flow chart of an embodiment carrier sensing method 720. The method 720 begins at block 722 and proceeds to block 724 where a communications controller receives a waveform signal from a UE. At block 726, the communications controller processes the signal and generates a decision variable, X. The signal processing here, in general done in the digital domain which is normally performed in baseband, may include sampling, analogue to digital (A/D) conversion, receiver's digital combining with precoding weighting, etc. The decision variable, X, is used to determine whether a channel is idle or busy. At block 728, the communications controller determines whether the decision variable X is less than a threshold, T. The threshold may be a standardized value, or derived from a standard or some regulation, which may be device type specific, or spatial specific. The threshold may also be allowed to change within a specified range according to information such as traffic loads or interference conditions. If, at block 728, the communications controller determines that the value of the decision variable, X, is less than the threshold, T, the method 720 proceeds to block 732 where the communications controller determines that the carrier channel is idle, after which, the method 720 ends at block 734. If, at block 728, the communications controller determines that the value of the decision variable, X, is not less than the threshold, T, then the method 720 proceeds to block 730 where the communications controller determines that the carrier channel is busy, after which, the method 720 ends at block 734.

Figure 8:
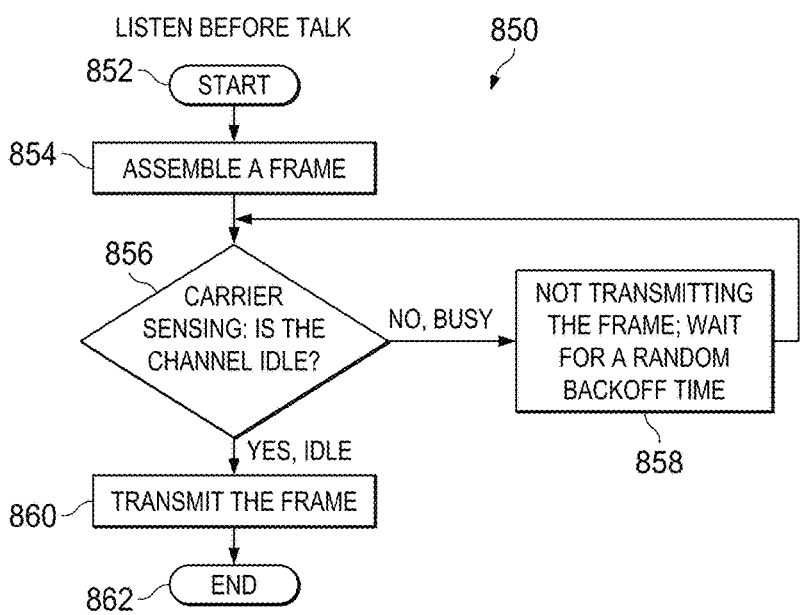
FIG. 8 illustrates a flow chart of an embodiment method of Listen-before-talk mechanism.

FIG. 8 illustrates a flow chart of a general listen-before-talk method 850. The method 850 begins at block 852 and proceeds to block 854 where a communications controller assembles a frame to be transmitted. At block 856, the communications controller performs carrier sensing, using a carrier sensing method such as the one described above with reference to FIG. 7, to determine if a channel is idle. If, at block 856, the communications controller determines that the channel is not idle, but is busy, then the method 850 proceeds to block 858 where the communications controller does not transmit the frame and waits for a random backoff timer to expire, after which, the method returns to block 856. If, at block 856, the communications controller determines that the channel is idle, the method 850 proceeds to block 860 where the communications controller transmits the frame, after which, the method ends at block 862.

Wi-Fi also uses the listen-before-talk mechanism. Wi-Fi uses the air interface technologies, such as the physical and media access control (MAC) layer in accordance with IEEE 802.11 standard. According to IEEE 802.11, a communication channel is shared by stations under a mechanism called distributed channel access with a function called distributed coordination function (DCF), which uses the carrier sense multiple access with collision avoidance protocol. The DCF uses both physical and virtual carrier sense functions to determine the state of a medium. The physical carrier sense function resides in the physical layer (PHY) and uses energy detection and preamble detection with frame length deferral to determine when the medium is busy. The virtual carrier sense function resides in the MAC and uses reservation information carried in the duration field of the MAC headers announcing impeding use of a wireless channel. The virtual carrier sense mechanism is called a network allocation vector (NAV). A wireless channel is determined to be idle only when both the physical and virtual carrier sense mechanisms indicate it to be so. A carrier sense multiple access with collision avoidance protocol used in Wi-Fi is illustrated in a diagram 970 of FIG. 9. A station with a data frame for transmission may first perform a CCA by sensing a wireless channel for a fixed duration, i.e., a DCF inter-frame space (DIFS). If the wireless channel is busy, the station waits until the channel becomes idle, defers for a DIFS, and then waits for a further random back-off period, e.g., by setting a back-off timer with an integer number of slots. The back-off timer decreases by one for every idle slot and freezes when the channel is sensed busy. When the back-off timer reaches zero, the station starts data transmission.

To meet the regulatory requirements of operating in unlicensed spectrums and to co-exist with other radio access technologies (RATs), such as Wi-Fi, transmissions in unlicensed spectrums may not be continuous or persistent in time. Rather, on/off, or opportunistic transmissions and measurements on demand may be adopted.

When operating in high-frequency bands, especially in the bands at 28 GHz to 60 GHz (or even up to 73 GHz and higher), which generally belong to the mmWave regime, different wave propagation characteristics from microwave (generally below 6 GHz) will occur. For example, mmWave experiences higher path loss over distance than microwave does. Further, additional losses for mmWaves at some frequencies may become non-negligible due to, e.g., oxygen or air absorption. In addition, wavelengths, antenna sizes, and antenna spacing when operating at higher frequencies may be smaller than those at lower frequencies, which may cause an antenna element at a receiver to capture much less energy. These factors may significantly reduce the range of mmWave coverage. Therefore, high-frequency bands may be more suitable for small cell operations than macro cell operations.

Small cells generally rely on beamforming with a large number of antennas for effective transmissions. For example, a small cell may have more than 16 antennas, or even a few hundreds of antennas. Note that at high frequencies, due to small wavelengths, antenna sizes, and antenna spacing, it is feasible to equip a node with a large number of antennas. As a result, the beams formed by the large number of antennas may be very narrow, for example, with a beamwidth of 10 deg. or even less. In contrast, traditional wireless communications system may have a beamwidth that is generally much wider, e.g., a beamwidth with tens of degrees. In general, it is regarded that narrow beams are a feature of mm Waves. As a general rule of thumb, a beamforming gain using a massive multiple-input and multiple-output (MIMO) technology may be roughly estimated as N×K, where N is the number of transmit antennas and K is the number of receive antennas. A 2-norm of a channel matrix H scales roughly according to $(N \times K)^{1/2}$ If the precoding vector by a transmitting node is p, and the combining vector by a receiving node is w, then the composite channel is w'Hp. By properly selecting w and p, the composite channel gain in energy may attain N×K, which is much higher than the beamforming gain obtained with fewer antennas. Most of the mmWave bands currently have not been assigned as dedicated licensed carriers for cellular communications, and some of the bands may be usable by cellular as unlicensed carriers. It would be expected that in future more and more mmWave bands may be usable by cellular, either as unlicensed carriers or licensed carriers.

Thus, it can be seen that when considering further evolution of small cell networks, one main scenario may be small cell networks with abundant resources in both node-density dimension and spectrum dimension, where the spectrum resources may be in low-frequency (e.g., sub-3 GHz or sub-6 GHz), high frequency (e.g., above 6 GHz or even above 28 GHz), unlicensed, shared-licensed or licensed bands. Specifically, LTE has proposed a network or system operating on unlicensed spectrums, which is also called an unlicensed LTE (U-LTE) network, a LTE on unlicensed (LTE-U) network, or a network with licensed-assisted access using LTE (LAA-LTE). According to LTE, small cells are generally overlaid with wider-area macro cells, which may be called hot areas, since the hot areas indicate enlarged areas as compared to hot spots. Such hot areas are generally deployed and controlled by network operators. For such hot areas, discontinuous, opportunistic, or on-demand transmissions (and reception) and measurements of signals and/or various types of interferences on flexibly selected resources are needed.

Figures 9, 10:
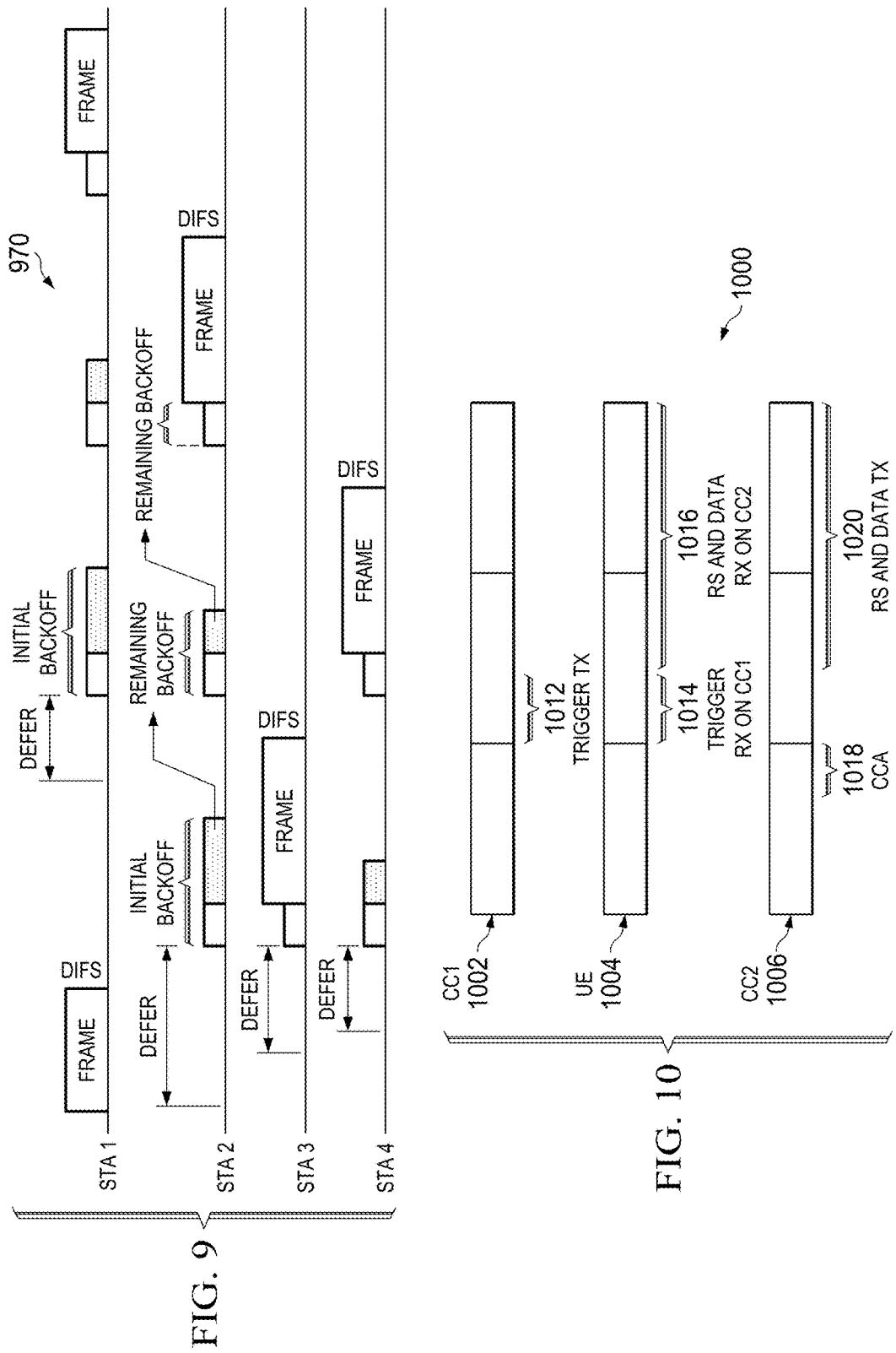
FIG. 9 illustrates a diagram of an embodiment carrier sense multiple access with collision avoidance protocol used in Wi-Fi.
FIG. 10 illustrates a diagram of an embodiment method for performing CSI measurement/feedback on demand in a U-LTE system.

FIG. 10 illustrates an embodiment method 1000 for performing transmission/CSI measurement/feedback on demand in a U-LTE system. In some embodiments, a U-LTE system may include multiple base stations transmitting over licensed and unlicensed spectrum, and multiple Wi-Fi nodes. FIG. 10 illustrates a subframe of a cellular cell CC1 1002, a subframe of a user equipment (UE) 1004, and a subframe of a cellular cell CC2 1006. CC1 1002 may be a cellular cell that UE 1004 is monitoring, and CC2 1006 may be an opportunistically on/off cell operating on an unlicensed carrier and has fast backhaul with CC1 1002. In one embodiment, CC1 1002 and CC2 1006 are collocated in one eNB. There is generally no DL RS for CSI measurements and reporting sent by CC2 1006 when it is not selected. Besides, CC2 1006 generally cannot transmit until it senses no transmission on that unlicensed carrier for a period of time, i.e., CC2 1006 has to perform clear channel assessment (CCA) before using the channel.

To support transmission on CC2 1006, CC2 1006 may perform a CCA 1018 in the last few OFDM symbols of the subframe of CC2 1006. If the channel is clear, then CC1 1002 may transmit an aperiodic CSI trigger 1012 for CC2 1006; otherwise CC2 1006 may repeat the CCA 1018 for a consecutive number of subframes. Generally the aperiodic CSI trigger 1012 is transmitted by CC1 1002 in its PDCCH in a subframe following a successful CCA by CC2 1006 (subject to backoff requirements, if any), and then the UE 1004 may detect and decode the aperiodic CSI trigger 1014 in at most a few symbol durations. Then starting from symbol x in that subframe which is no earlier than the end of the aperiodic CSI trigger 1012, CC2 1006 may start transmission of DL RS/data 1020. Upon receiving the aperiodic CSI trigger 1014, the UE 1004 starts monitoring CC2 1006 (and possibly data), and may receive the RS/data transmission from CC2 1006. An aperiodic CSI report may be generated and sent to the network (e.g. CC1 1002). With the CSI report, CC2 1006 may accordingly perform link adaptation for its transmissions. In an embodiment, CC2 1006 may need to reserve the channel after CCA. CC2 1006 may also perform CCA until the first few symbols of the subframe that the aperiodic CSI trigger 1012 is sent, and transmit data/RS immediately after the CCA. The aperiodic CSI trigger 1012 may be alternatively transmitted in CC1 1002's EPDCCH, which occupies last symbols of a subframe but normally not the first few symbols. In this case the CCA and the EPDCCH containing the aperiodic CSI trigger may be done in one subframe. Then the RS/data transmission may start from a subframe after the EPDCCH. To make sure that the UE 1004 has sufficient time to detect and decode EPDCCH and prepare for monitoring CC2 1006, the RS/data transmission may avoid the first few OFDM symbols of that subframe. The method 1000 may be used for wireless communications using an unlicensed spectrum and an access technology different from U-LTE.

It should be pointed out that, FIG. 10 describes that the CCA is performed at the end of a subframe. The next subframe starts without CCA, but just control/data transmissions. However, a definition of subframe boundary may be modified so that the CCA is viewed as being performed at the beginning of a subframe. The resulting frame structure is similar, except for that the range of OFDM symbols that a PDCCH/EPDCCH is associated with is reduced. This variation may be applicable to embodiment frame structures throughout this disclosure. Further, the terms "carrier" and "channel" are used interchangeably throughout this disclosure.

Figure 11:
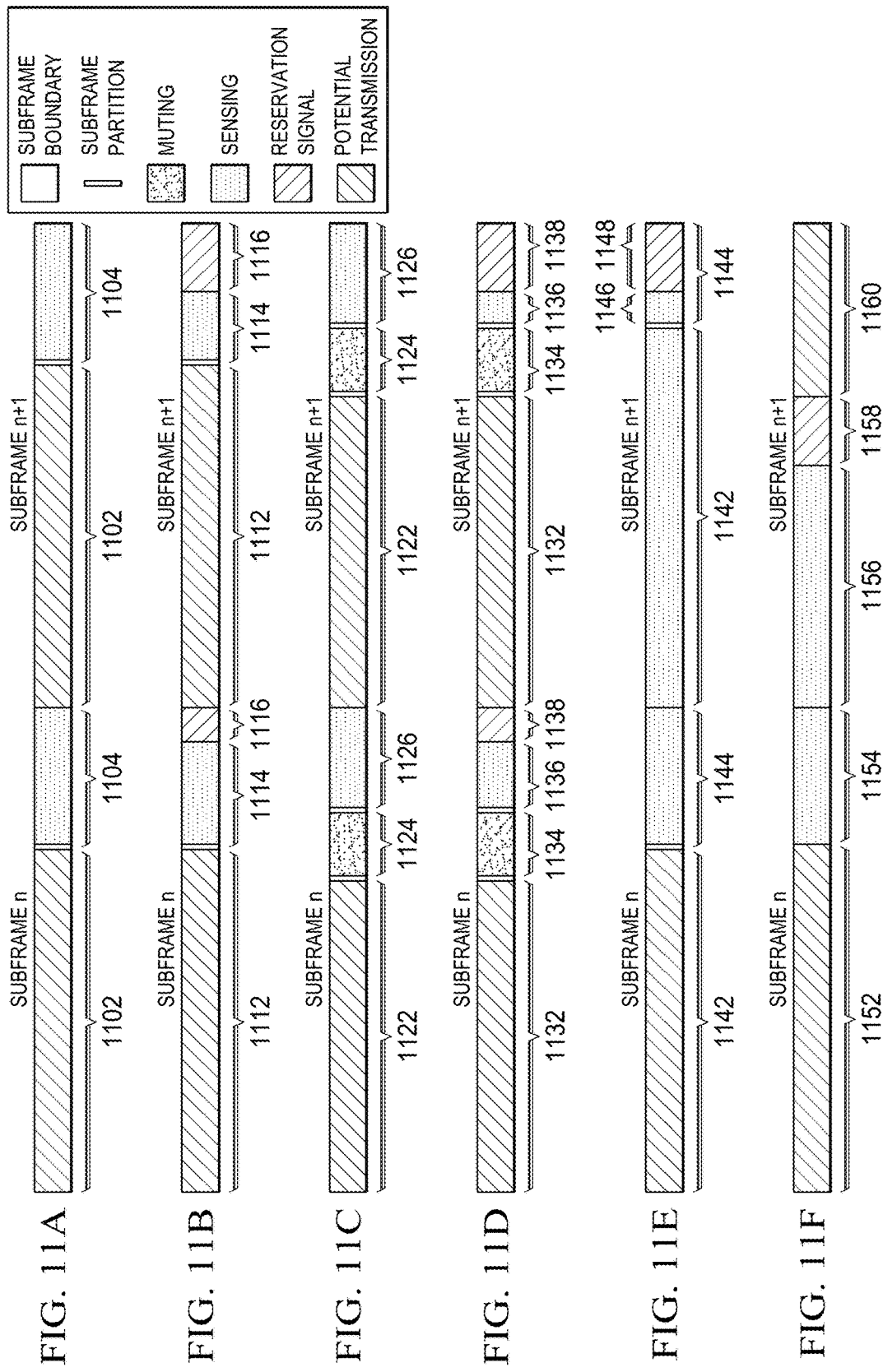
FIGS. 11A-11F illustrates diagrams of embodiment subframe structures in a U-LTE system.

FIG. 11 illustrates embodiment subframe structures for communicating data in an unlicensed spectrum in a U-LTE system. The subframes may be that illustrated in FIG. 2 and may be used in, e.g., wireless communication systems illustrated in FIGS. 1B-1C. For example, each subframe may have a duration of 1 millisecond and include 14 OFDM symbols, and may be used by CC2 1006 in FIG. 10 for transmitting wireless signals and data. The subframes illustrated in FIG. 11 may also be used in a communications system using an unlicensed spectrum and an access technology different from U-LTE.

FIG. 11A illustrates two consecutive subframes, namely, subframe n and subframe n+1. In accordance with some embodiments, a U-LTE node may perform carrier sensing in the last portion of a first subframe to determine whether a channel or a carrier in an unlicensed spectrum is available, and transmission of data and/or control may start from the beginning of a second subframe if the transmission is determined allowable before the second subframe. As shown in FIG. 11A, each subframe is partitioned into two sections or regions, namely, a section 1102 and a section 1104. In one embodiment, the two sections may be arranged as illustrated in FIG. 11A. The section 1102 may be used for potential data transmissions and the section 1104 may be dedicated for sensing whether a carrier in the unlicensed spectrum is idle. For example, the section 1104 may be allocated for performing CCA. If the U-LTE node determines through carrier sensing that it may use a channel in an unlicensed spectrum before a next subframe starts, it waits until the next subframe starts to transmit data (provided that the decision of the channel being usable is not altered later). The durations of sections 1102 for different subframes may be the same of different. Likewise, the durations of sections 1104 for different subframes may be the same or different. In accordance with some embodiments, the two sections 1102 and 1104 of a subframe may be slotted, i.e., each section may include a number of "small slots", usually equally spaced. For example, the section 1102 may include a number of OFDM symbols. There may be an integer number or non-integer number of OFDM symbols in a section, similar to the TDD special subframe design. In accordance with other embodiments, the section 1104 for carrier sensing may include multiple CCA intervals, each with a duration of 20 microseconds (μs) (i.e., the minimum duration as required by the ETSI EN 301 893 V1.7.1 standard; other durations required by regulations may also be used). The intervals may not be of the same lengths. Specifically, one may be longer to fit a total section duration. In another embodiment, the duration of each CCA interval is 34 μs, i.e., the same duration as the Wi-Fi DIFS. In yet another embodiment, the duration of each CCA interval is 40 μs, which is slightly longer than the Wi-Fi DIFS and is a multiple of the minimum duration.

FIG. 11B illustrates two consecutive subframes, namely, subframe n and subframe n+1. In accordance with some embodiments, a node may perform carrier sensing in the last portion of each subframe, and may start transmitting one or more reservation signals till the beginning of the next subframe if the transmission is determined to be allowable according to the carrier sensing results. The normal data/control transmission starts from the beginning of the next subframe. As shown, each of the subframes n and n+1 includes a first section 1112 for data transmission, a second section 1114 for sensing whether a carrier in an unlicensed spectrum is available for data transmission, and a third section 1116 for transmitting one or more reservation signals to reserve the available channel. This provides more flexibility for the node to access a channel in the unlicensed spectrum. In one embodiment, the three sections may be arranged as illustrated in FIG. 11B. After the node starts the reservation signal transmission over the channel, other nodes (e.g. Wi-Fi nodes) hearing this transmission would not transmit data, leaving the channel for this node to use. In an embodiment, the reservation signal is a RS signal. The eNB may transmit a RS immediately after it determines a channel is available. However, if the control/data transmission is deferred to the $1^{st}$ symbol of the next subframe, the duration of the RS may not be pre-determined and becomes not fixed since the starting time of the RS may vary per carrier sensing result. In one embodiment, a variable-duration RS (VDRS) may be used for transmitting a reservation signal. The length of the sensing section 1114 may be determined by traffic loads of a U-LTE system and other RATs (e.g. Wi-Fi), densities of nodes in the U-LTE system, spectrum efficiency of the nodes, and UE distributions. The longer the sensing section 1114, the larger the overhead which may not be used for data transmission, but the more opportunities for a node to grab a channel. In accordance with some embodiments, the duration of the section 1112 in one subframe may be the same or different from the duration of the section 1112 in another subframe. Similarly, the durations of the section 1114 and the section 1116 may vary in different subframes.

FIG. 11C illustrates two consecutive subframes, namely, subframe n and subframe n+1. In accordance with some embodiments, a node may perform carrier sensing in the last portion of each subframe, and transmission of data/control may start from the beginning of a subframe if transmission is determined allowable before the subframe, and the node may mute its transmission before the sensing starts. As shown in FIG. 11C, each of the subframes n and n+1 includes a first section 1122 for potential data transmissions, a second section 1124 for muting, and a third section 1126 for carrier sensing. In one embodiment, the three sections may be arranged as illustrated in FIG. 11C. During the muting, the node will not transmit any signal over a channel, thus clearing the channel for other nodes and/or nodes using other RATs to access the channel. The node may or may not sense the channel during the muting duration, but does not decrease its backoff counter.

The durations of the first section 1122, second section 1124 and third section 1126 of one subframe may be the same as or different from that of a different subframe. In an embodiment, the muting section 1124 may have a variable duration for different subframes. The length of the muting duration may be determined adaptively by the relative and absolute traffic loads of a U-LTE system and other RATs (e.g. Wi-Fi), and relative and absolute densities of nodes of the U-LTE system, relative and absolute spectrum efficiency of the nodes, and relative and absolute distributions of UEs. The muting duration may also be randomized. Performance evaluation has shown that randomizing a muting duration provides throughput performance benefits and latency performance benefits to both a U-LTE system and a Wi-Fi system. For a subframe having a variable-duration muting section 1124, the duration of the data/control transmission section 1122 and/or the carrier sensing section 1126 may be changed, and signaling necessary for a UE to receive data and/or a reservation signal may be sent to the UE. For example, a node may schedule the UE with different PDSCH durations, containing different numbers of OFDM symbols. A TDD special subframe may also be used to change the duration of the muting section 1124. When the carrier section 1126 includes multiple CCA intervals, the number of CCA intervals may also be changed.

The subframe structure with muting as illustrated in FIG. 11C may also be combined with reservation signal transmission. FIG. 11D illustrates two consecutive subframes, namely, subframe n and subframe n+1. Each of the subframes n and n+1 includes a first section 1132 for potential data transmissions, a second section 1134 for muting, a third section 1136 for carrier sensing, and a fourth section 1138 for carrying a reservation signal. In one embodiment, the four sections may be arranged as illustrated in FIG. 11D. A subframe may mute for the duration of the second section 1134 and begin sensing the availability of a channel in an unlicensed spectrum. When the availability of the channel is determined, the subframe may transmit the reservation signal carried in the fourth section 1138 to reserve the channel. Data transmission may start from the beginning of the next subframe. Durations of the first section 1132, the second section 1134, the third section 1136, and the fourth section 1138 of one subframe may be the same as or different from that of a different subframe.

FIG. 11E illustrates two consecutive subframes n and n+1. In accordance with some embodiments, a U-LTE node may sense the availability of a channel in an unlicensed spectrum and decrease its backoff counter during the section that data transmission may occur. As shown in FIG. 11E, each of the subframes includes a first section 1142 for data transmission and a second section 1144 for carrier sensing. However, carrier sensing may be performed during the second section 1144 of subframe n, and also during a part or all of the first section 1142 of the subframe n+1, where data transmission may occur. If the carrier sensing determines that a channel is available, data transmission may start from the beginning of a subframe after the subframe n+1. The carrier sensing may further be extended to a part or all of the second section 1144 of the subframe n+1, such as the section 1146. A reservation signal may be sent in the second section 1144 of the subframe n+1 dedicated for carrier sensing (but not for data transmission and/or muting) if the channel is sensed to be available. For example, a section 1148 within the second section 1144 of the subframe n+1 is used to transmit a reservation signal. In accordance with some embodiments, a reservation signal may be sent at any time when the carrier sensing determines a channel is idle. For example, a reservation signal may be sent during the section 1142 of the subframe n+1 after a channel is sensed to be idle. Data transmission may start from the beginning of a subframe after the subframe n+1.

In accordance with some embodiments, a U-LTE node may sense availability of a channel in an unlicensed spectrum and decrease its backoff counter at any time, and transmission of a reservation signal may start at any time if the backoff counter reaches zero, i.e., when the channel is determined to be idle, followed by data transmission. As shown in FIG. 11F illustrating two consecutive subframes n and n+1. The subframe n includes a section 1152 for data transmission and a section 1154 for carrier sensing. The carrier sensing may be continued from the beginning of the subframe n+1 in a section 1156 of the subframe n+1. When a channel is determined to be idle through carrier sensing, a reservation signal may be transmitted in a section 1158 in the subframe n+1, and data transmission may start in a section 1160 of the subframe n+1 following the section 1158. The reservation signal may be transmitted for a network to signal a trigger to a UE for monitoring this channel for RS transmission and data transmission. A VDRS for the reservation signal may be used as the time needed for the UE to decode the trigger and transition to acquire the channel may not be pre-determined. In one embodiment, the VDRS may not be transmitted in a variable duration, and the UE may receive the VDRS in a variable duration.

Carrier sensing may be extended to mmWave frequencies. In one embodiment, carrier sensing with omni-directional antennas, or carrier sensing with directional antennas may be used for mmWave frequencies, due to the high directionality of typical transmissions at an mmWave frequency. Further, carrier sensing may not be performed for mmWave frequencies. For Wi-Fi nodes in a network without U-LTE nodes, carrier sensing with proper parameters is helpful, especially in the cases of a Wi-Fi-only system with high density and high traffic. For U-LTE systems without any coexisting Wi-Fi nodes, sensing may not be needed. In a wireless communications system with coexisting U-LTE and Wi-Fi, carrier sensing may be preferred by Wi-Fi devices but not by U-LTE devices. When carrier sensing is found useful, directional sensing may outperform omni-directional sensing. In an embodiment, a Wi-Fi node may send out a signal of congestion for other RATs to account for. The signal may indicate that a channel is excessively busy, leading to exponential backoff of the Wi-Fi node. Nodes from other RATs, such as U-LTE, may increase their muting duration or switch to a different channel to ease the congestion of the Wi-Fi node.

In accordance with some embodiments, parameters for carrier sensing may be determined according to traffic loads, node densities, carrier frequencies, on/off status of nodes, and other information of a wireless communications system. Exchanges of this information across nodes may be supported. Measurements for the quantities of carrier sensing parameters may also be supported, e.g., at a node, or UE or both. The sensing parameters may include a sensing threshold, muting durations, sensing durations, sensing starting time, and sensing directionality.

In accordance with some embodiment, boundaries of each subframe and of the sections within each subframe may be aligned across different U-LTE nodes. Alternatively, the starting time of a reservation signal may be different for different nodes in a subframe. The subframes may have a structure as illustrated in FIGS. 11A-11F. Different U-LTE nodes may exchange information and coordinate with each other for any potential changes of the starting and ending time of each section within a subframe. The U-LTE nodes may include intra-operator nodes and inter-operator nodes. In one embodiment, both the intra-operator nodes and inter-operator nodes are coordinated. Alternatively, only the intra-operator nodes are coordinated.

Figure 12:
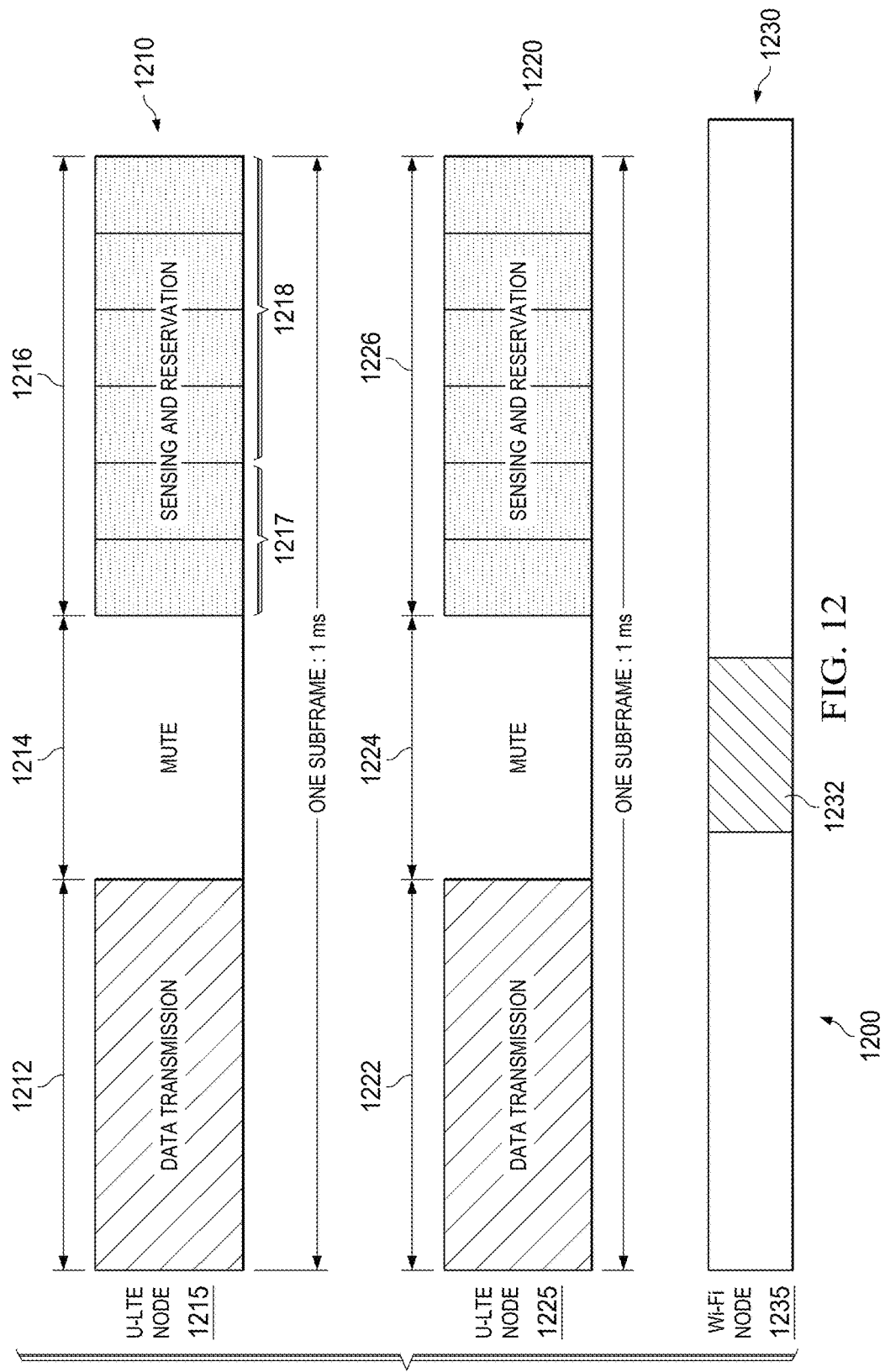
FIG. 12 illustrates a diagram of embodiment subframes for communications of multiple nodes in a U-LTE system.

FIG. 12 illustrates embodiment subframes 1200 for communications of multiple nodes of a wireless communications system or network. FIG. 12 illustrate a subframe 1210 for a first U-LTE node 1215, a subframe 1220 for a second U-LTE node 1225, and carrier resources 1230 for a Wi-Fi node 1235. The first U-LTE node 1215, the second U-LTE node 1215 and the Wi-Fi node 1235 share a same channel of the network. The subframe 1210 includes a section or region 1212 for data transmission, a section 1214 for muting, a section 1216 for carrier sensing and reservation, which may be referred to as a sensing region. The subframe 1220 includes a section 1222 for data transmission, a section 1224 for muting, and a section 1226 for carrier sensing and reservation. The section 1212 may be aligned with the section 1222, the section 1214 may be aligned with section 1224, and the section 1216 may be aligned with the section 1226. The first U-LTE node 1215 and the second U-LTE node 1225 may be coordinated with each other for wireless data communications. In this example, both the first U-LTE node 1215 and the second U-LTE node 1225 communicate over a same channel in unlicensed spectrum, and the first U-LTE node 1215 may have occupied the channel in a subframe preceding the subframe 1210, and thus is able to transmit data, e.g., in the section 1212 of the subframe 1210. The subframe 1210 may mute for duration of the section 1214 and perform carrier sensing in a section 1217. When the carrier sensing determines that the channel is idle, a reservation signal is transmitted in a section 1218 of the subframe 1210. The second U-LTE node 1225 performs carrier sensing in the section 1226 and senses the reservation signal transmitted by the first U-LTE node 1215. Thus the second U-LTE node 1225 determines that the channel is not clear and does not send any reservation signal to reserve the channel. The Wi-Fi node 1235 transmits data and completes the data transmission in a section 1232 of the carrier resources 1230 during the muting period of the first U-LTE node 1215 and the second U-LTE node 1225. After the transmission, the Wi-Fi node 1235 may sense the channel for the next transmission opportunity, but when it receives the reservation signal transmitted by the first U-LTE node 1215, it would determine the channel is not available and would not transmit.

As shown in FIG. 12, when the second U-LTE node 1225 receives the reservation signal transmitted by the first U-LTE node 1215 while performing carrier sensing, it determines that the channel is not clear and does not send any reservation signal, and consequently will not transmit any data over the channel. Thus only the first U-LTE node 1215 occupies the channel and is able to transmit data over the channel, resulting in a low reuse factor. To improve the reuse factor of a channel in unlicensed spectrums, mechanisms may be applied so that multiple nodes in a wireless communications network may transmit data over the same channel in unlicensed spectrum during the same time period or with at least a portion of the data transmitted overlapping with each other in time. This may be helpful for improving the reuse factor, or even achieving a reuse factor one of U-LTE, improving spectrum efficiency. Reuse factor one herein refers to a situation that different U-LTE nodes transmit at the same time and frequency resources.

Figure 13:
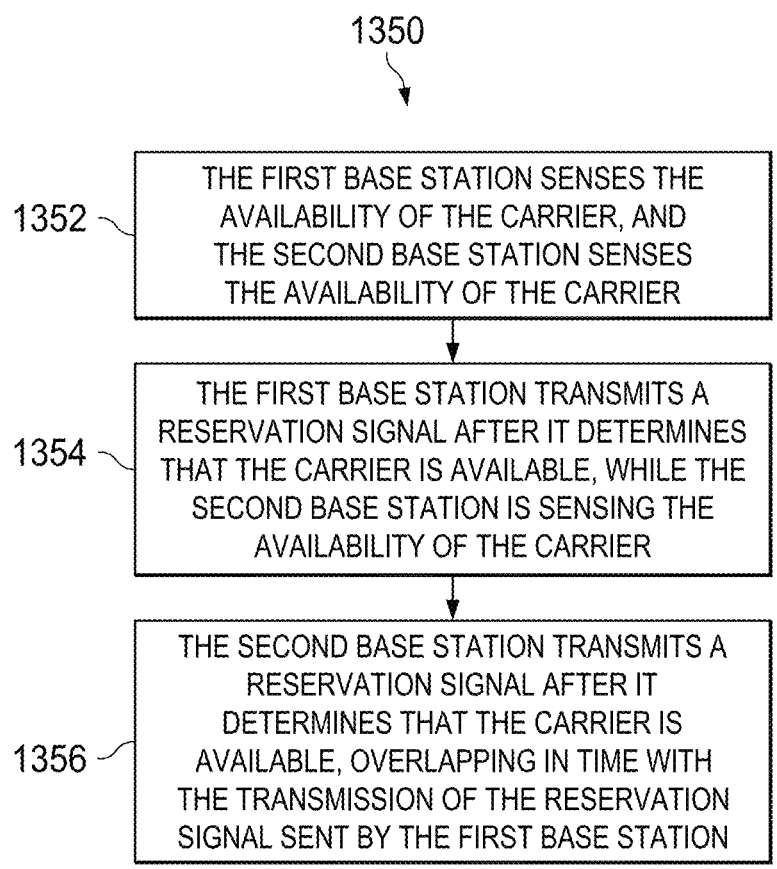
FIG. 13 illustrates a flow chart of an embodiment method for wireless communications.

FIG. 13 illustrates an embodiment method 1350 for wireless communications in a telecommunications network where reuse factor may be increased. The method may be applied to any wireless communications system or network where multiple nodes share a same carrier. The carrier may be in unlicensed spectrums, shared-licensed spectrums, or spectrums that are not licensed for any specific uses. In the example as shown in FIG. 13, the wireless network has two network elements, such as two base stations, communicating data over a same carrier in unlicensed spectrums, and each of the base stations is configured to sense the availability of the carrier in a sensing region of a frame, and to transmit a reservation signal when the carrier is determined to be available. In one embodiment, the two network elements are within a listening distance. A listening distance herein refers to a distance in which a received signal power of a reference signal is high enough to allow detection of the reference signal. A sensing region herein refers to a region or a section in a frame where a base station may sense the availability of a carrier and transmit a reservation signal to reserve the carrier if the carrier is determined to be available. The sensing region may also be used by a base station to transmit other signals or data as needed. The reservation signal herein is a signal that may be used to indicate reservation of a carrier, and may also include other signal information. One of ordinary skill in the art would recognize many variations, alternatives and modifications for the reservation signal. The reservation signal used in the description herein is for illustrative purpose only, and should not be construed to be limiting to the scope of the claims.

In one embodiment as shown in Step 1352 of FIG. 13, both of the base stations may be sensing the carrier for availability in a sensing region of a frame, each with their respective CCA counter set and decreasing. A first base station may find the carrier idle and transmit a reservation signal in its sensing region in Step 1354, while a second base station is still sensing the carrier in its sensing region. During the transmission of the reservation signal by the first base station, the second base station may also find that the carrier is available and start to transmit a reservation signal in Step 1356. Thus the transmission of at least a part of the reservation signal of the first base station overlaps in time with the transmission of the reservation signal transmitted by the second base station. Since each of the base stations determines that the carrier is available, each base station may start to transmit data over the carrier in a data region of the same frame or a subsequent frame, disregarding whether the other base station has transmitted a reservation signal.

In accordance with some embodiments, while a first base station determines a carrier idle and transmits a first reservation signal in a sensing region of a frame, a second base station, within a listening distance of the first base station, may receive or sense the first reservation signal in its sensing region, but still determine that the carrier is available to it and transmit a second reservation signal to reserve the carrier. Thus both the base station may use the channel for transmission at the same time, increasing the reuse factor of the carrier. In one embodiment, interference/signal cancellation may be used by the second base station to remove or cancel the first reservation signal received by the second base station. In some embodiments, the second base station sensing the first reservation signal may perform interference cancellation on all sensed or detected signals of the second base station over the carrier to remove the first reservation signal by subtracting the sensed first reservation signal from all the sensed signals over the carrier. If the remaining or residual signal power level after the subtraction is less than a threshold, the carrier is determined to be idle or available.

For example, in a wireless network having multiple U-LTE nodes communicating over an unlicensed spectrum, a first U-LTE node sensing the availability of a channel may perform signal/interference cancellation on a reservation signal transmitted by a second U-LTE node. That is, the first U-LTE node receiving a reservation signal transmitted by the second U-LTE node may still reserve a channel that has been reserved by the second U-LTE node if the channel is not occupied by any other nodes other than the second node. For a U-LTE node to cancel a reservation signals from another node, the U-LTE node may exchange information about the reservation signals with the other node, and the information may include starting time of the reservation signal, scrambling sequence, antenna port, modulation format, and time and frequency resources. As more information is exchanged between two nodes, a better cancelation performance may be achieved. Alternatively, a first U-LTE node that wants to cancel a reservation signal of a second U-LTE node may not exchange any information with the second U-LTE node, e.g., when the first U-LTE node and the second U-LTE node are from different operators.

Figure 14:
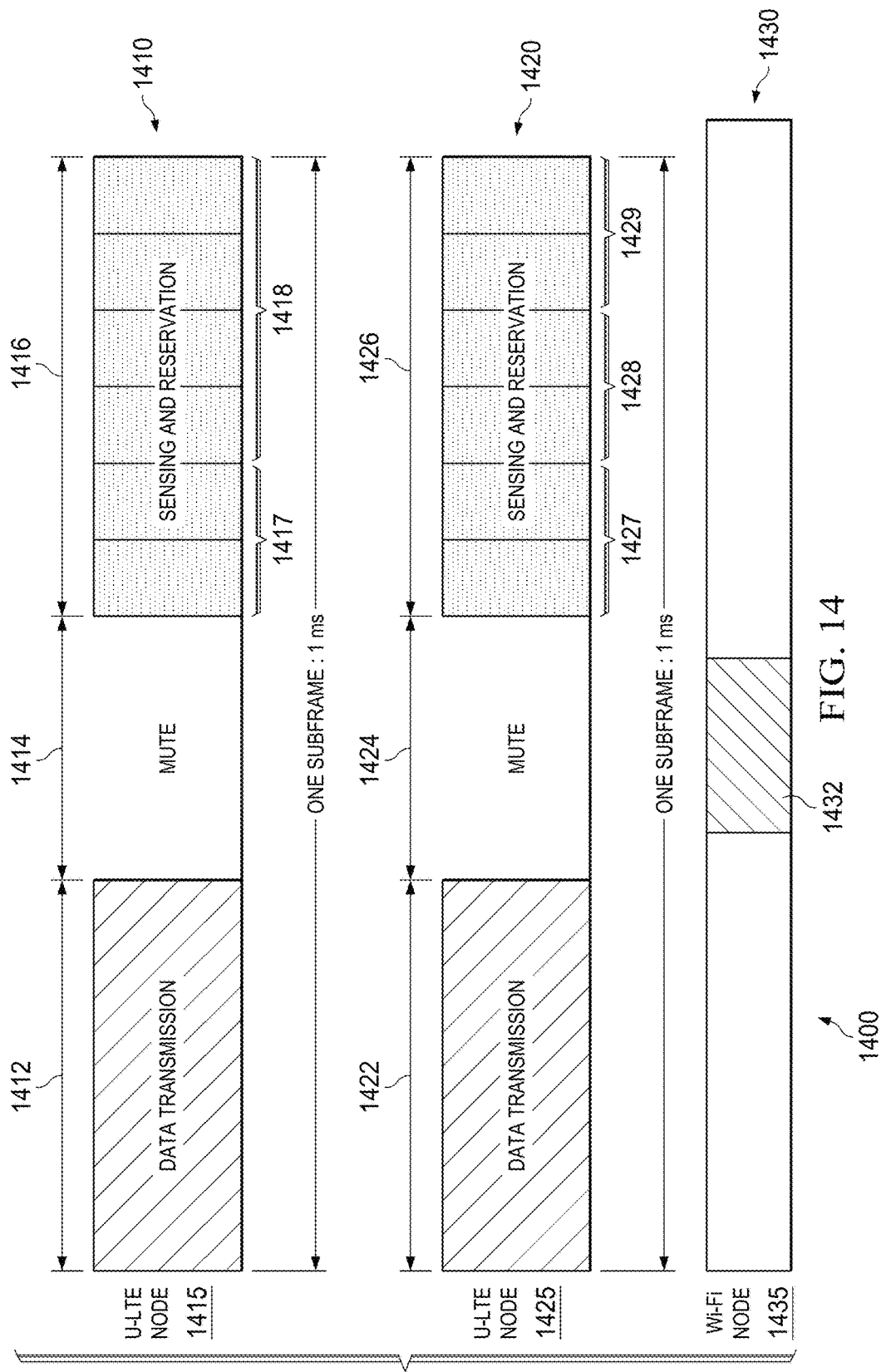
FIG. 14 illustrates a diagram of embodiment subframes for communications of multiple nodes in a U-LTE system with signal cancellation.

FIG. 14 illustrates embodiment subframes 1400 for communications of multiple network nodes of a wireless communications system with signal/interference cancellation. FIG. 14 illustrate a subframe 1410 for a first U-LTE node 1415, a subframe 1420 for a second U-LTE node 1425, and carrier resources 1430 for a Wi-Fi node 1435. In one embodiment, the first U-LTE node 1415 is within a listening distance of the second U-LTE node 1425. In another embodiment, the two nodes are neighboring base stations. The subframe 1410 includes a section 1412 for data transmission, a section 1414 for muting, and a section 1416 for carrier sensing and reservation, which is a sensing region. The subframe 1420 includes a section 1422 for data transmission, a section 1424 for muting, and a section 1426 for carrier sensing and reservation. The section 1412 may be aligned with the section 1422, the section 1414 may be aligned with section 1424, and the section 1416 may be aligned with the section 1426. The first U-LTE node 1415 and the second U-LTE node 1425 may be coordinated with each other for wirelessly communicating data. In this example, both the first U-LTE node 1415 and the second U-LTE node 1425 communicate over a same channel in unlicensed spectrum, and the first U-LTE node 1415 may have occupied the channel in a subframe preceding the subframe 1410, and thus is able to transmit data in the section 1412 of the subframe 1410. The first U-LTE node 1415 may mute for duration of the section 1414 and perform carrier sensing in a section 1417. When the carrier sensing determines that the channel is idle, a reservation signal is transmitted in a section 1418 of the subframe 1410. The second U-LTE node 1425, in this example, may also have occupied the channel in a subframe preceding the subframe 1420, and is able to transmit data, e.g., in the section 1422 of the subframe 1420. The second U-LTE node 1425 may mute for the duration of the section 1424 and perform carrier sensing in the section 1427. The second U-LTE node 1425 continues to sense the channel in a section 1428, and receives or senses in the section 1428 the reservation signal transmitted by the first U-LTE node 1415. Upon the sense of the reservation signal from the first U-LTE node 1415, the second U-LTE node 1425 performs signal cancellation to cancel the reservation signal from the first U-LTE node 1415 in the section 1428. The signal cancellation may be performed with or without information about the reservation signal from the first U-LTE node 1415. While cancelling the reservation signal from the first U-LTE node 1415, the second U-LTE node 1425 continues to sense whether it has received any other signals from other nodes of the wireless communications system except the first U-LTE node 1415. If the second U-LTE node 1425 has received, after performing cancelation of the reservation signal from the first U-LTE node 1415, one or more signals from other nodes but all the signal received have a signal energy below a predefined threshold, the second U-LTE node 1425 determines that the channel is clear in this sensing slot and may decrease its time counter. When the counter reaches zero, the second U-LTE node 1425 determines that the channel is idle and may be used, and transmits a reservation signal in a section 1429 of the subframe 1420 over the channel. Thus the transmission of at least a part or portion of the reservation signal of the U-LTE node 1415 is overlapping in time with the transmission of the reservation signal of the U-LTE node 1425. As shown in FIG. 14, the section 1429 in the subframe 1420 is the overlapping time duration of the transmission of the two reservation signals. As a result, both the first U-LTE node 1415 and the second U-LTE node 1425 reserve the same channel, and may transmit data over the same channel in its respective subframe 1410 or 1420, or in a different subframe, e.g., a frame immediately following the subframe 1410 and 1420, respectively. Therefore, by the second U-LTE node 1425's cancelling of a reservation signal from the first U-LTE node 1415, the reuse factor is increased in the wireless communications system. The Wi-Fi node 1435 transmits data and completes the data transmission in a section 1432 of the carrier resources 1430 during the muting period of the first U-LTE node 1415 and the second U-LTE node 1425. After the transmission, the Wi-Fi node 1435 may sense the channel for the next transmission opportunity. When the Wi-Fi node 1435 receives reservation signals transmitted by both the first U-LTE node 1415 and the second U-LTE node 1425, it would determine that the channel is not available and would not transmit any data. In accordance with some embodiments, multiple reservation signals from multiple U-LTE nodes may be canceled by the U-LTE node 1425 before the U-LTE node 1425 determines whether a channel is clear.

In an embodiment of a method for wireless communications, a second network element may sense a first reservation signal transmitted by a first network element in a sensing region of a frame communicated over a carrier, where the first network element and the second network element share the carrier. The second network element may perform interference cancellation on sensed signals of the second network element to remove the first reservation signal from the sensed signals, thereby generating a residual sensed signal. When a power level of the residual sensed signal is less than a threshold, the second network element may transmit a second reservation signal in the sensing region of the frame. In one embodiment, the second reservation signal may at least partially overlap the first reservation signal in the time domain. The second network element may also transmit data in a data region following the sensing region of the frame, and the data region may be in the frame or in a subsequent frame. In one embodiment, the first network element and the second network element may be neighboring base stations in a wireless network. The carrier may be an unlicensed carrier or a shared-licensed carrier.

In accordance yet with some other embodiments, reuse factor may be increased by transmitting reservation signals over different frequency resources. For example, in a wireless communications network having multiple U-LTE nodes communicating over an unlicensed spectrum, a U-LTE node sensing the availability of a channel may exclude one or more frequency resources, i.e., may not use the excluded frequency resources. In one embodiment, the excluded frequency resources may be used by another U-LTE node to transmit a reservation signal. In another embodiment, two or more neighboring U-LTE nodes may transmit respective reservation signals over different frequency resources, and one of the nodes transmitting a reservation signal may not cause the other node to be unable to transmit in the same channel. Thus, multiple U-LTE nodes may transmit their respective reservation signals during the same time period, or with at least a part of the transmission time overlapping with each other. A Wi-Fi node sensing the channel may not be able to use a channel if a reservation signal is present in the channel. In one embodiment, two U-LTE nodes may also sense the availability of the carrier over different frequency resources.

Figure 15:
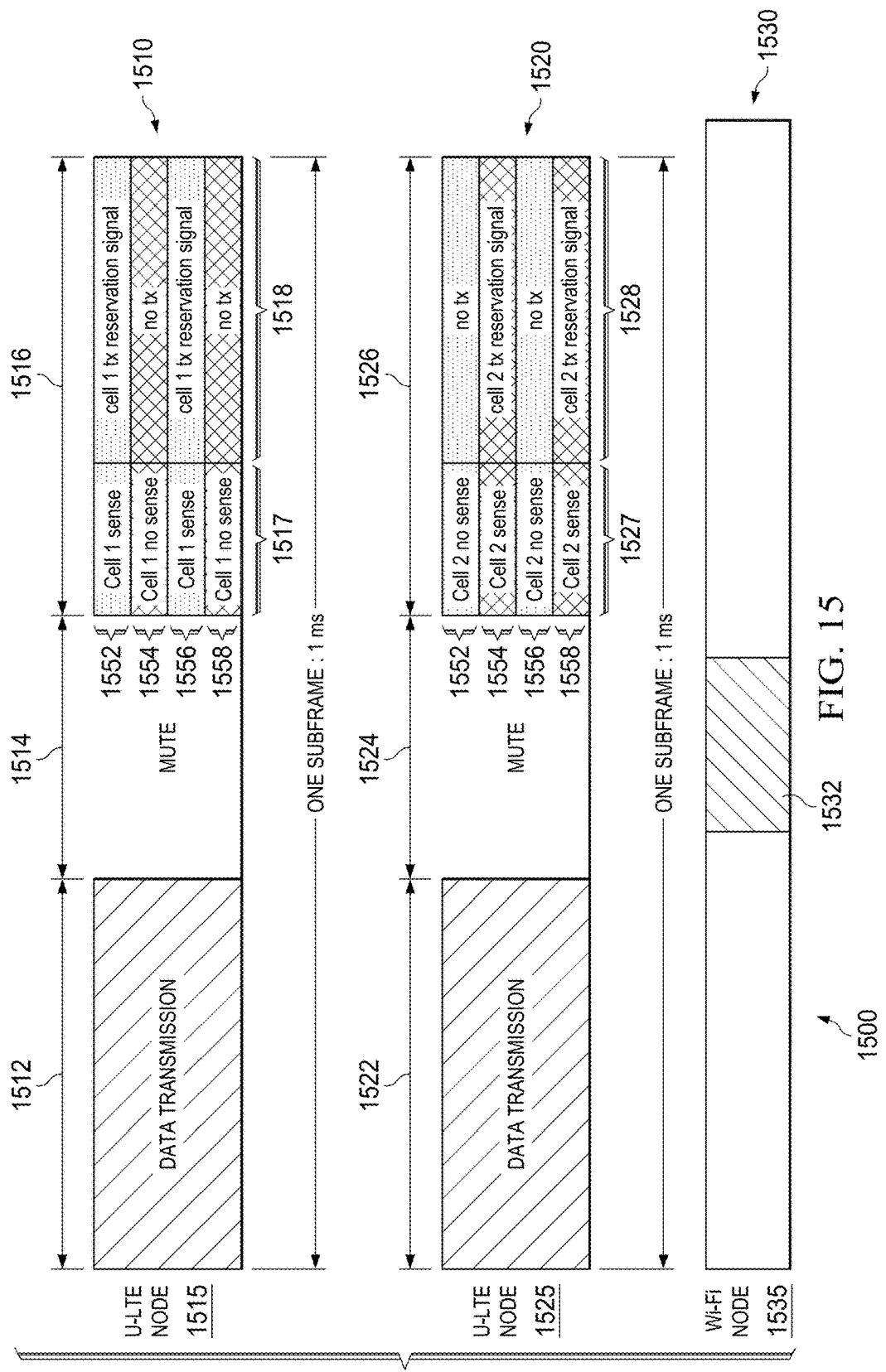
FIG. 15 illustrates a diagram of embodiment subframes for communications of multiple nodes of in U-LTE system with resource orthogonalization.

FIG. 15 illustrates embodiment subframes 1500 for communications of multiple U-LTE nodes of a wireless communications system with resource orthogonalization. FIG. 15 illustrate a subframe 1510 for a first U-LTE node 1515, a subframe 1520 for a second U-LTE node 1525, and carrier resources 1530 for a Wi-Fi node 1535. The first U-LTE node 1515 is within a listening distance of the second U-LTE node 1525. For example, the first U-LTE node 1515 and the second U-LTE node 1525 are neighboring base stations in a wireless network. The subframe 1510 includes a section 1512 for data transmission, a section 1514 for muting, and a section 1516 for carrier sensing and reservation, which is a sensing region. The subframe 1520 includes a section 1522 for data transmission, a section 1524 for muting, and a section 1526 for carrier sensing and reservation, which is also a sensing region. The section 1512 may be aligned with the section 1522, the section 1514 may be aligned with section 1524, and the section 1516 may be aligned with the section 1526. The first U-LTE node 1515 and the second U-LTE node 1525 may be coordinated with each other for wirelessly communicating data. In this example, both the first U-LTE node 1515 and the second U-LTE node 1525 communicate data over a same channel in unlicensed spectrums. As described above, the carrier may also be in a shared-licensed spectrum or any spectrum that is not licensed for specific use. As shown in FIG. 15, each of the subframes 1510 and 1520 includes four frequency sections 1552, 1554, 1556 and 1558. The first U-LTE node 1515 performs carrier sensing and transmits a reservation signal in frequency sections 1552 and 1556 only, while the second U-LTE node 1525 performs carrier sensing and transmits a reservation signal in frequency sections 1554 and 1558 only. A frequency section herein refers to a frequency resource, and may be a subcarrier, a set of subcarriers, RB, RBG, subband, or other frequency unit that is applicable. In one embodiment, the frequency resources 1552, 1554, 1556 and 1558 are orthogonal to each other. For example, each of the frequency sections 1552, 1554, 1556 and 1558 may include a set of frequency subcarriers orthogonal to each other. Thus the first U-LTE node 1515 and the second U-LTE node 1525 sense the channel and transmit reservation signals over different frequency resources, i.e., the frequency sections 1552, 1554, 1556 and 1558. The frequency resources may be pre-allocated to the first U-LTE node 1515 and the second U-LTE node 1525. In this embodiment, the first U-LTE node 1515 may have occupied the channel in a subframe preceding the subframe 1510, and is able to transmit data in the section 1512 of the subframe 1510. The subframe 1510 may mute for the duration of the section 1514 and perform carrier sensing in the frequency sections 1552 and 1556 of the channel in a section 1517, excluding the frequency sections 1554 and 1558. When the first U-LTE node 1515 determines that the channel is idle on its allocated frequency resources, i.e., the frequency sections 1552 and 1556, a reservation signal is transmitted over the frequency sections 1552 and 1554 in a section 1518 of the subframe 1510. The first U-LTE node 1515 may transmit its data in a subsequent subframe, e.g., from the beginning of the subsequent subframe. The second U-LTE node 1525, in this example, may also have occupied the channel in a subframe preceding the subframe 1520, and can transmit data in the section 1522 of the subframe 1520. The second U-LTE node 1525 may mute for the duration of the section 1524 and perform carrier sensing over the frequency sections 1554 and 1558 in a section 1527. When the second U-LTE node 1525 determines that the channel is idle on its allocated frequency resources, i.e., frequency sections 1554 and 1558, a reservation signal is transmitted over the frequency sections 1554 and 1558 in a section 1528 of the subframe 1520. Since the reservation signals of the U-LTE nodes 1515 and 1525 are transmitted over different frequency resources, transmission of the two reservation signals may be performed at the same time, or with a least a part of one reservation signal transmitted during a time duration overlapping with the transmission of another reservation signal. Thus both the U-LTE nodes 1515 and 1525 determine that the carrier is idle for them, and they may transmit data in its respective subframe 1510 or 1520, or in a subsequent frame. In accordance with some embodiments, the length of the section 1517 may be the same as or different from the section 1527, and the length of the section 1518 may be the same as or different from the section 1528, The Wi-Fi node 1535 transmits data and completes the data transmission in a section 1532 of the carrier resources 1530 during the muting period of the first U-LTE node 1515 and the second U-LTE node 1525, and may sense the channel for the next transmission opportunity after the data transmission. When the Wi-Fi node 1535 receives a reservation signal transmitted by the first U-LTE node 1515 or the second U-LTE node 1525, it would determine that the channel is not available and would not transmit any data.

In an embodiment of a method for wireless communications, a first network element may transmit a first reservation signal over a first set of frequency subcarriers of a carrier in a sensing region of a frame. The first reservation signal may at least partially overlap a second reservation signal in the time domain, and the second reservation signal is transmitted by a second network element over a second set of frequency subcarriers of the carrier orthogonal to the first set of frequency subcarriers. In this embodiment, the first network element is within a listening distance of the second network element. In one embodiment, the first network element may sense the first set of frequency subcarriers in the sensing region, and determine that the carrier is unoccupied when a power level of sensed signals in the first set of frequency subcarriers is greater than a threshold. After the transmission of the first reservation signal over the first set of frequency subcarriers, the first network element may transmit data in a data region following the sensing region of the frame, and the data region may be in the frame or in a subsequent frame. The carrier may be an unlicensed carrier or a shared-licensed carrier.

Figure 16:
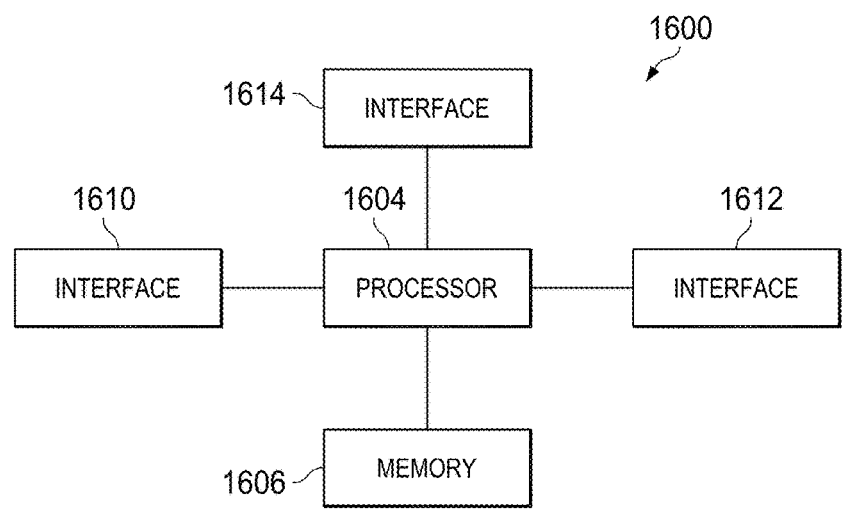
FIG. 16 illustrates a block diagram of an embodiment processing system.

FIG. 16 illustrates a block diagram of an embodiment processing system 1600 for performing methods described herein, which may be installed in a host device, such as in a network element of a telecommunications network. As shown, the processing system 1600 includes a processor 1604, a memory 1606, and interfaces 1610-1614, which may (or may not) be arranged as shown in FIG. 16. The processor 1604 may be any component or collection of components adapted to perform computations and/or other processing related tasks, and the memory 1606 may be any component or collection of components adapted to store programming and/or instructions for execution by the processor 1604. In an embodiment, the memory 1606 includes a non-transitory computer readable medium. The interfaces 1610, 1612, 1614 may be any component or collection of components that allow the processing system 1600 to communicate with other devices/components and/or a user. For example, one or more of the interfaces 1610, 1612, 1614 may be adapted to communicate data, control, or management messages from the processor 1604 to applications installed on the host device and/or a remote device. As another example, one or more of the interfaces 1610, 1612, 1614 may be adapted to allow a user or user device (e.g., personal computer (PC), etc.) to interact/communicate with the processing system 1600. The processing system 1600 may include additional components not depicted in FIG. 16, such as long term storage (e.g., non-volatile memory, etc.).

In some embodiments, the processing system 1600 is included in a network element or device that is accessing, or part otherwise of, a telecommunications network. In one example, the processing system 1600 is in a network-side device in a wireless or wireline telecommunications network, such as a base station, a relay station, a scheduler, a controller, a gateway, a router, an applications server, or any other device in the telecommunications network. In other embodiments, the processing system 1600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network. In some embodiments, one or more of the interfaces 1610, 1612, 1614 connect the processing system 1600 to a transceiver adapted to transmit and receive signaling over the telecommunications network.

Figure 17:
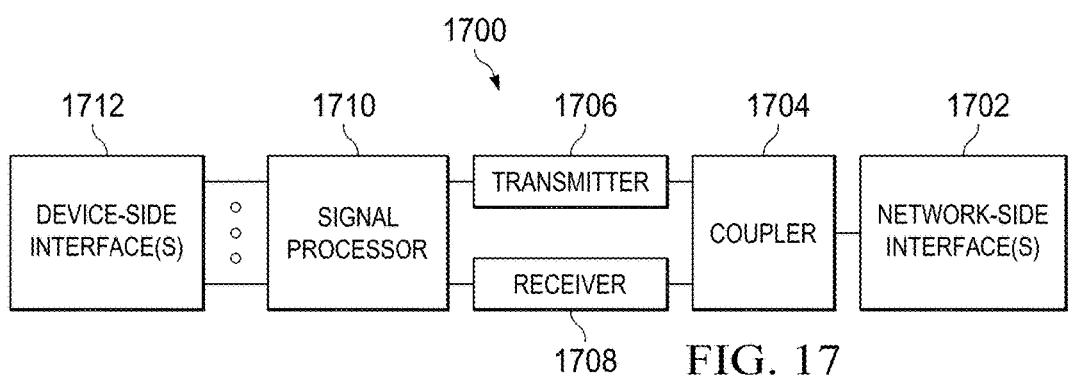
FIG. 17 illustrates a block diagram of an embodiment transceiver.

FIG. 17 illustrates a block diagram of a transceiver 1700 adapted to transmit and receive signaling over a telecommunications network. The transceiver 1700 may be installed in a host device. As shown, the transceiver 1700 comprises a network-side interface 1702, a coupler 1704, a transmitter 1706, a receiver 1708, a signal processor 1710, and a device-side interface 1712. The network-side interface 1702 may include any component or collection of components adapted to transmit or receive signaling over a wireless or wireline telecommunications network. The coupler 1704 may include any component or collection of components adapted to facilitate bi-directional communication over the network-side interface 1702. The transmitter 1706 may include any component or collection of components (e.g., up-converter, power amplifier, etc.) adapted to convert a baseband signal into a modulated carrier signal suitable for transmission over the network-side interface 1702. The receiver 1708 may include any component or collection of components (e.g., down-converter, low noise amplifier, etc.) adapted to convert a carrier signal received over the network-side interface 1702 into a baseband signal. The signal processor 1710 may include any component or collection of components adapted to convert a baseband signal into a data signal suitable for communication over the device-side interface(s) 1712, or vice-versa. The device-side interface(s) 1712 may include any component or collection of components adapted to communicate data-signals between the signal processor 1710 and components within the host device (e.g., the processing system 1600, local area network (LAN) ports, etc.).

The transceiver 1700 may transmit and receive signaling over any type of communications medium. In some embodiments, the transceiver 1700 transmits and receives signaling over a wireless medium. For example, the transceiver 1700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1702 comprises one or more antenna/radiating elements. For example, the network-side interface 1702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for wireless communications, comprising:
sensing, by a second network element, a first reservation signal transmitted by a first network element in a sensing region of a frame communicated over a carrier, the first reservation signal being transmitted to reserve the carrier for transmission by the first network element, wherein the first network element and the second network element share the carrier and are from different operators;
determining, by the second network element, whether the carrier is available for transmission by the second network element by performing cancellation on sensed signals of the second network element to remove the first reservation signal from the sensed signals; and
transmitting, by the second network element, a second reservation signal in the sensing region of the frame to reserve the carrier for transmission by the second network element in response to determining that the carrier is available, the carrier being determined to be available when a power level of the sensed signal after the cancellation is performed is less than a threshold, wherein both the first network element and the second network element reserve the carrier for transmission.

2. The method of claim 1, wherein the second reservation signal at least partially overlaps the first reservation signal in the time domain.

3. The method of claim 1, further comprising:
transmitting, by the second network element, data in a data region following the sensing region of the frame, the data region being in the frame or in a subsequent frame.

4. The method of claim 1, wherein the first network element and the second network element are neighboring base stations in a wireless network.

5. The method of claim 1, wherein the carrier is an unlicensed carrier.

6. The method of claim 1, wherein the carrier is a shared-licensed carrier.

7. A second network element comprising:
a processor; and
a non-transitory computer readable storage medium storing programming for execution by the processor, the programming including instructions to:
sense a first reservation signal transmitted by a first network element in a sensing region of a frame communicated over a carrier, the first reservation signal being transmitted to reserve the carrier for transmission by the first network element, wherein the first network element and the second network element share the carrier and are from different operators;
determine whether the carrier is available for transmission by the second network element by performing cancellation on sensed signals of the second network element to subtract the first reservation signal from the sensed signals; and
transmit a second reservation signal in the sensing region of the frame to reserve the carrier for transmission by the second network element in response to determining that the carrier is available, the carrier being determined to be available when a power level of the sensed signal after the cancellation is performed is less than a threshold, wherein both the first network element and the second network element reserve the carrier for transmission.

8. The second network element of claim 7, wherein the second reservation signal at least partially overlaps the first reservation signal in the time domain.

9. The second network element of claim 7, wherein the programming comprises further instructions to:
transmit data in a data region following the sensing region of the frame, the data region being in the frame or in a subsequent frame.

10. The second network element of claim 7, wherein the first network element and the second network element are neighboring base stations in a wireless network.

11. The second network element of claim 7, wherein the carrier is an unlicensed carrier.

12. The second network element of claim 7, wherein the carrier is a shared-licensed carrier.

13. A method for wireless communications, comprising:
determining, by a first network element, whether a carrier is available for transmission by the first network element by:
performing carrier sensing over a first set of frequency subcarriers of the carrier in a sensing region of a frame excluding a second set of frequency subcarriers of the carrier, the first set of frequency subcarriers of the carrier being orthogonal to the second set of frequency subcarriers of the carrier; and
determining that the carrier is unoccupied when a power level of sensed signals in the first set of frequency subcarriers excluding the second set of frequency subcarriers of the carrier is greater than a threshold; and
transmitting, by the first network element in response to determining that the carrier is available, a first reservation signal over the first set of frequency subcarriers of the carrier in the sensing region to reserve the carrier, wherein the first reservation signal at least partially overlaps a second reservation signal in the time domain, the second reservation signal being transmitted by a second network element over the second set of frequency subcarriers of the carrier, and the second reservation signal being transmitted to reserve the carrier for the second network element in response to determining that the carrier is available for transmission by the second network element, wherein the carrier is determined to be available for transmission by the second network element based on carrier sensing that is performed over the second set of frequency subcarriers of the carrier excluding the first set of frequency subcarriers of the carrier, wherein both the first network element and the second network element reserve the carrier, and the first network element is within a listening distance of the second network element.

14. The method of claim 13, further comprising:
transmitting, by the first network element, data in a data region following the sensing region of the frame, the data region being in the frame or in a subsequent frame.

15. The method of claim 13, wherein the carrier is an unlicensed carrier.

16. The method of claim 13, wherein the carrier is a shared-licensed carrier.

17. A first network element comprising:
a processor; and
a non-transitory computer readable storage medium storing programming for execution by the processor, the programming including instructions to:
determine whether a carrier is available for transmission by the first network element by:
performing carrier sensing over a first set of frequency subcarriers of the carrier in a sensing region of a frame excluding a second set of frequency subcarriers of the carrier, the first set of frequency subcarriers of the carrier being orthogonal to the second set of frequency subcarriers of the carrier; and
determining that the carrier is unoccupied when a power level of sensed signals in the first set of frequency subcarriers excluding the second set of frequency subcarriers of the carrier is greater than a threshold; and
transmit, in response to determining that the carrier is available for transmission by the first network element, a first reservation signal over the first set of frequency subcarriers of the carrier in the sensing region of the frame to reserve the carrier, wherein the first reservation signal at least partially overlaps a second reservation signal in the time domain, the second reservation signal being transmitted by a second network element over the second set of frequency subcarriers of the carrier, and the second reservation signal being transmitted to reserve the carrier for the second network element in response to determining that the carrier is available for transmission by the second network element based on carrier sensing performed over the second set of frequency subcarriers of the carrier excluding the first set of frequency subcarriers of the carrier, wherein both the first network element and the second network element reserve the carrier, and the first network element is within a listening distance of the second network element.

18. The first network element of claim 17, wherein the programming comprises further instructions to:
   transmit data in a data region following the sensing region of the frame, the data region being in the frame or in a subsequent frame.

19. The first network element of claim 17, wherein the carrier is an unlicensed carrier.

20. The first network element of claim 17, wherein the carrier is a shared-licensed carrier.

\* \* \* \* \*